US012574538B2

(12) United States Patent
Fang et al.

(10) Patent No.: US 12,574,538 B2
(45) Date of Patent: Mar. 10, 2026

(54) MOTION COMPENSATION METHOD, APPARATUS AND STORAGE MEDIUM

(71) Applicant: Alibaba (China) Co., Ltd., Zhejiang (CN)

(72) Inventors: Shuqing Fang, Hangzhou (CN); Jianhua Chen, Hangzhou (CN); Yan Ye, San Diego, CA (US)

(73) Assignee: Alibaba (China) Co., Ltd., Hangzhou (CN)

( * ) Notice: Subject to any disclaimer, the term of this patent is extended or adjusted under 35 U.S.C. 154(b) by 0 days.

(21) Appl. No.: 18/616,881

(22) Filed: Mar. 26, 2024

(65) Prior Publication Data

US 2024/0333958 A1 Oct. 3, 2024

(30) Foreign Application Priority Data

Mar. 28, 2023 (CN) .......................... 202310336734.6

(51) Int. Cl.
| | |
|---|---|
| *G06T 7/231* | (2017.01) |
| *H04N 19/105* | (2014.01) |
| *H04N 19/176* | (2014.01) |
| *H04N 19/182* | (2014.01) |
| *H04N 19/51* | (2014.01) |

(52) U.S. Cl.
CPC ........... *H04N 19/51* (2014.11); *H04N 19/105* (2014.11); *H04N 19/176* (2014.11); *H04N 19/182* (2014.11)

(58) Field of Classification Search
CPC .... H04N 19/51; H04N 19/105; H04N 19/176; H04N 19/182; H04N 19/523; H04N 19/533; H04N 19/56; H04N 19/57; H04N 19/52
See application file for complete search history.

(56) References Cited

U.S. PATENT DOCUMENTS

| | | | |
|---|---|---|---|
| 6,480,670 B1 * | 11/2002 | Hatano | H04N 19/179 375/E7.122 |
| 2004/0247029 A1 | 12/2004 | Zhong et al. | |
| 2012/0082209 A1 * | 4/2012 | Li | H04N 19/176 375/E7.126 |

(Continued)

FOREIGN PATENT DOCUMENTS

| | | |
|---|---|---|
| CN | 102917221 A | 2/2013 |
| CN | 113365081 A | 9/2021 |
| CN | 113870302 A | 12/2021 |

OTHER PUBLICATIONS

Office Action issued in corresponding Chinese Application No. 202310336734.6 on May 31, 2025, (6 pages).

*Primary Examiner* — Howard D Brown, Jr.

(74) *Attorney, Agent, or Firm* — Finnegan, Henderson, Farabow, Garrett & Dunner, LLP

(57) ABSTRACT

A motion compensation method, includes acquiring a motion vector of an initial search point in a reference frame of an adjacent block to a to-be-processed block in a to-be-processed image and a motion vector of the adjacent block; determining a search range in the reference frame based on the motion vector of the initial search point and the motion vector of the adjacent block; determining a target pixel in the search range; and performing motion compensation on the to-be-processed block based on the motion vector of the target pixel.

20 Claims, 12 Drawing Sheets

(56)     References Cited

U.S. PATENT DOCUMENTS

| | | | |
|---|---|---|---|
| 2015/0078451 A1* | 3/2015 | Tourapis | H04N 19/533 |
| | | | 375/240.16 |
| 2017/0006285 A1* | 1/2017 | Lin | H04N 19/521 |
| 2021/0407105 A1* | 12/2021 | Bao | G06T 7/231 |
| 2022/0021898 A1* | 1/2022 | He | H04N 19/521 |
| 2023/0030020 A1* | 2/2023 | Li | H04N 19/172 |
| 2024/0333958 A1* | 10/2024 | Fang | H04N 19/57 |
| 2024/0348830 A1* | 10/2024 | Wang | H04N 19/176 |

* cited by examiner

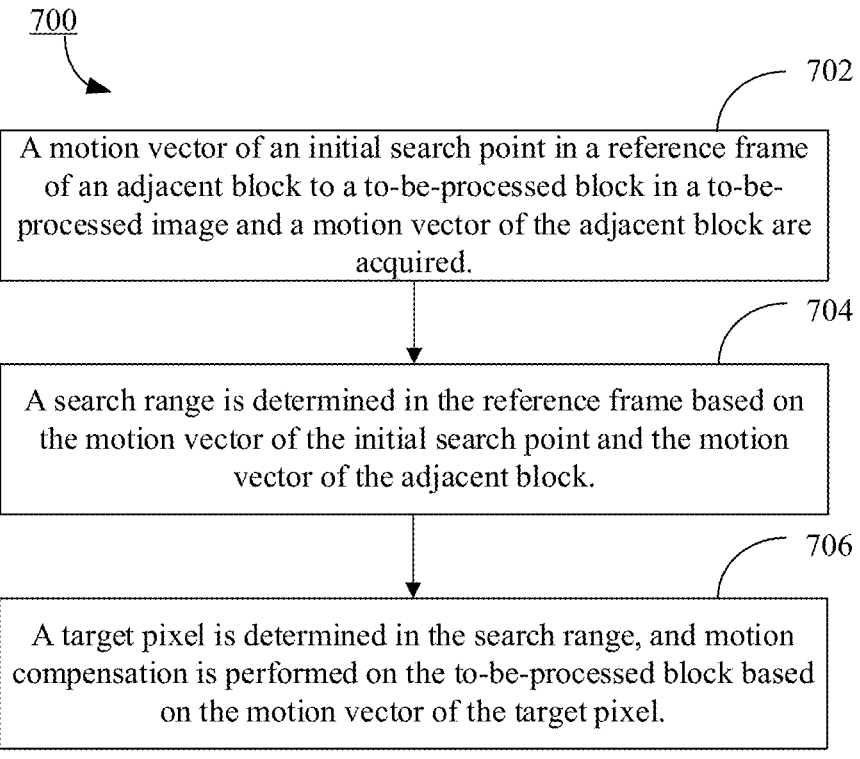

700

702

A motion vector of an initial search point in a reference frame of an adjacent block to a to-be-processed block in a to-be-processed image and a motion vector of the adjacent block are acquired.

704

A search range is determined in the reference frame based on the motion vector of the initial search point and the motion vector of the adjacent block.

706

A target pixel is determined in the search range, and motion compensation is performed on the to-be-processed block based on the motion vector of the target pixel.

FIG. 7

MOTION COMPENSATION METHOD, APPARATUS AND STORAGE MEDIUM

CROSS-REFERENCE TO RELATED APPLICATIONS

The disclosure claims the benefits of priority to Chinese Application No. 202310336734.6, filed Mar. 28, 2023, which is incorporated herein by reference in its entirety.

TECHNICAL FIELD

The present disclosure generally relates to image processing, and more particularly, to a motion compensation method, an apparatus and a storage medium.

BACKGROUND

Motion compensation is a method of describing a difference between adjacent frames (the term "adjacent" here means two frames being adjacent in terms of coding, but not necessarily adjacent in a play order), that is, describing how each block in a reference frame moves to a current frame. Specifically, for each block, the block most similar to the current block, i.e., the matching block, is found within a specific search range of the reference frame, and a Motion Vector (MV) (i.e., the position coordinates of the matching block relative to the current block) is output, and then motion compensation is implemented based on the motion vector.

When searching for the matching block, the search range is generally fixed, resulting in many ineffective searches. Moreover, this approach has high search complexity and long search time.

SUMMARY OF THE DISCLOSURE

Embodiments of the present disclosure provide a motion compensation method. The method includes: acquiring a motion vector of an initial search point in a reference frame of an adjacent block to a to-be-processed block in a to-be-processed image and a motion vector of the adjacent block; determining a search range in the reference frame based on the motion vector of the initial search point and the motion vector of the adjacent block; determining a target pixel in the search range; and performing motion compensation on the to-be-processed block based on the motion vector of the target pixel.

Embodiments of the present disclosure provide an apparatus for motion compensation. The apparatus includes a memory configured to store instructions; and one or more processors configured to execute the instructions to cause the apparatus to perform operations including: acquiring a motion vector of an initial search point in a reference frame of an adjacent block to a to-be-processed block in a to-be-processed image and a motion vector of the adjacent block; determining a search range in the reference frame based on the motion vector of the initial search point and the motion vector of the adjacent block; determining a target pixel in the search range; and performing motion compensation on the to-be-processed block based on the motion vector of the target pixel.

Embodiments of the present disclosure provide a non-transitory computer-readable storage medium that stores a set of instructions that is executable by one or more processors of an apparatus to cause the apparatus to perform operations. The operations includes: acquiring a motion vector of an initial search point in a reference frame of an adjacent block to a to-be-processed block in a to-be-processed image and a motion vector of the adjacent block; determining a search range in the reference frame based on the motion vector of the initial search point and the motion vector of the adjacent block; determining a target pixel in the search range; and performing motion compensation on the to-be-processed block based on the motion vector of the target pixel.

BRIEF DESCRIPTION OF THE DRAWINGS

Embodiments and various aspects of the present disclosure are illustrated in the following detailed description and the accompanying figures. Various features shown in the figures are not drawn to scale.

FIG. 7 is a flow chart of an exemplary motion compensation method, according to some embodiments of the present disclosure.

DETAILED DESCRIPTION

Figure 1:
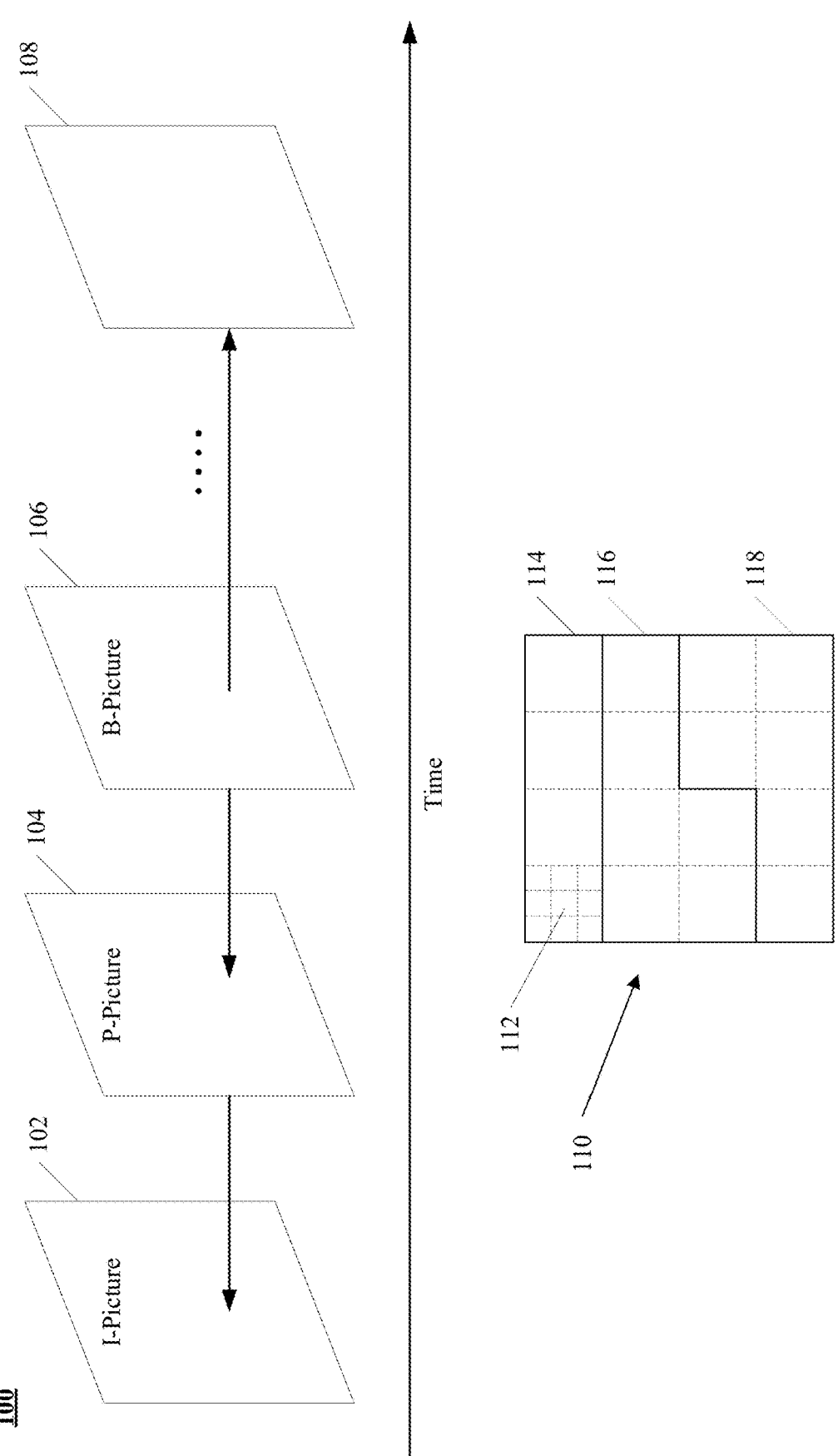
FIG. 1 is a schematic diagram illustrating structures of an example video sequence, according to some embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

The Joint Video Experts Team (JVET) of the ITU-T Video Coding Expert Group (ITU-T VCEG) and the ISO/IEC Moving Picture Expert Group (ISO/IEC MPEG) is currently developing the Versatile Video Coding (VVC/H.266) standard. The VVC standard is aimed at doubling the compression efficiency of its predecessor, the High Efficiency Video Coding (HEVC/H.265) standard. In other words, VVC's goal is to achieve the same subjective quality as HEVC/H.265 using half the bandwidth.

To achieve the same subjective quality as HEVC/H.265 using half the bandwidth, the JVET has been developing technologies beyond HEVC using the joint exploration model (JEM) reference software. As coding technologies were incorporated into the JEM, the JEM achieved substantially higher coding performance than HEVC.

The VVC standard has been developed recently and continues to include more coding technologies that provide better compression performance. VVC is based on the same hybrid video coding system that has been used in modern video compression standards such as HEVC, H.264/AVC, MPEG2, H.263, etc.

A video is a set of static pictures (or "frames") arranged in a temporal sequence to store visual information. A video capture device (e.g., a camera) can be used to capture and store those pictures in a temporal sequence, and a video playback device (e.g., a television, a computer, a smartphone, a tablet computer, a video player, or any end-user terminal with a function of display) can be used to display such pictures in the temporal sequence. Also, in some applications, a video capturing device can transmit the captured video to the video playback device (e.g., a computer with a monitor) in real-time, such as for surveillance, conferencing, or live broadcasting.

For reducing the storage space and the transmission bandwidth needed by such applications, the video can be compressed before storage and transmission and decompressed before the display. The compression and decompression can be implemented by software executed by a processor (e.g., a processor of a generic computer) or specialized hardware. The module for compression is generally referred to as an "encoder," and the module for decompression is generally referred to as a "decoder." The encoder and decoder can be collectively referred to as a "codec." The encoder and decoder can be implemented as any of a variety of suitable hardware, software, or a combination thereof. For example, the hardware implementation of the encoder and decoder can include circuitry, such as one or more microprocessors, digital signal processors (DSPs), application-specific integrated circuits (ASICs), field-programmable gate arrays (FPGAs), discrete logic, or any combinations thereof. The software implementation of the encoder and decoder can include program codes, computer-executable instructions, firmware, or any suitable computer-implemented algorithm or process fixed in a computer-readable medium. Video compression and decompression can be implemented by various algorithms or standards, such as MPEG-1, MPEG-2, MPEG-4, H.26x series, or the like. In some applications, the codec can decompress the video from a first coding standard and re-compress the decompressed video using a second coding standard, in which case the codec can be referred to as a "transcoder."

The video encoding process can identify and keep useful information that can be used to reconstruct a picture and disregard unimportant information for the reconstruction. If the disregarded, unimportant information cannot be fully reconstructed, such an encoding process can be referred to as "lossy." Otherwise, it can be referred to as "lossless." Most encoding processes are lossy, which is a tradeoff to reduce the needed storage space and the transmission bandwidth.

The useful information of a picture being encoded (referred to as a "current picture") include changes with respect to a reference picture (e.g., a picture previously encoded and reconstructed). Such changes can include position changes, luminosity changes, or color changes of the pixels, among which the position changes are mostly concerned. Position changes of a group of pixels that represent an object can reflect the motion of the object between the reference picture and the current picture.

A picture coded without referencing another picture (i.e., it is its own reference picture) is referred to as an "I-picture." A picture is referred to as a "P-picture" if some or all blocks (e.g., blocks that generally refer to portions of the video picture) in the picture are predicted using intra prediction or inter prediction with one reference picture (e.g., uni-prediction). A picture is referred to as a "B-picture" if at least one block in it is predicted with two reference pictures (e.g., bi-prediction).

FIG. 1 illustrates structures of an example video sequence 100, according to some embodiments of the present disclosure. Video sequence 100 can be a live video or a video having been captured and archived. Video 100 can be a real-life video, a computer-generated video (e.g., computer game video), or a combination thereof (e.g., a real-life video with augmented-reality effects). Video sequence 100 can be inputted from a video capture device (e.g., a camera), a video archive (e.g., a video file stored in a storage device) containing previously captured video, or a video feed interface (e.g., a video broadcast transceiver) to receive video from a video content provider.

As shown in FIG. 1, video sequence 100 can include a series of pictures arranged temporally along a timeline, including pictures 102, 104, 106, and 108. Pictures 102-106 are continuous, and there are more pictures between pictures 106 and 108. In FIG. 1, picture 102 is an I-picture, the reference picture of which is picture 102 itself. Picture 104 is a P-picture, the reference picture of which is picture 102, as indicated by the arrow. Picture 106 is a B-picture, the reference pictures of which are pictures 104 and 108, as indicated by the arrows. In some embodiments, the reference picture of a picture (e.g., picture 104) can be not immediately preceding or following the picture. For example, the reference picture of picture 104 can be a picture preceding picture 102. It should be noted that the reference pictures of pictures 102-106 are only examples, and the present disclosure does not limit embodiments of the reference pictures as the examples shown in FIG. 1.

Typically, video codecs do not encode or decode an entire picture at one time due to the computing complexity of such tasks. Rather, they can split the picture into basic segments, and encode or decode the picture segment by segment. Such basic segments are referred to as basic processing units ("BPUs") in the present disclosure. For example, structure 110 in FIG. 1 shows an example structure of a picture of video sequence 100 (e.g., any of pictures 102-108). In structure 110, a picture is divided into 4×4 basic processing units, the boundaries of which are shown as dash lines. In some embodiments, the basic processing units can be referred to as "macroblocks" in some video coding standards (e.g., MPEG family, H.261, H.263, or H.264/AVC), or as "coding tree units" ("CTUs") in some other video coding standards (e.g., H.265/HEVC or H.266/VVC). The basic processing units can have variable sizes in a picture, such as 128×128, 64×64, 32×32, 16×16, 4×8, 16×32, or any arbitrary shape and size of pixels. The sizes and shapes of the basic processing units can be selected for a picture based on the balance of coding efficiency and levels of details to be kept in the basic processing unit.

The basic processing units can be logical units, which can include a group of different types of video data stored in a computer memory (e.g., in a video frame buffer). For example, a basic processing unit of a color picture can include a luma component (Y) representing achromatic brightness information, one or more chroma components (e.g., Cb and Cr) representing color information, and associated syntax elements, in which the luma and chroma components can have the same size of the basic processing unit. The luma and chroma components can be referred to as "coding tree blocks" ("CTBs") in some video coding standards (e.g., H.265/HEVC or H.266/VVC). Any operation performed to a basic processing unit can be repeatedly performed to each of its luma and chroma components.

Video coding has multiple stages of operations, examples of which are shown in FIGS. 2A-2B and FIGS. 3A-3B. For each stage, the size of the basic processing units can still be too large for processing, and thus can be further divided into segments referred to as "basic processing sub-units" in the present disclosure. In some embodiments, the basic processing sub-units can be referred to as "blocks" in some video coding standards (e.g., MPEG family, H.261, H.263, or H.264/AVC), or as "coding units" ("CUs") in some other video coding standards (e.g., H.265/HEVC or H.266/VVC). A basic processing sub-unit can have the same or smaller size than the basic processing unit. Similar to the basic processing units, basic processing sub-units are also logical units, which can include a group of different types of video data (e.g., Y, Cb, Cr, and associated syntax elements) stored in a computer memory (e.g., in a video frame buffer). Any operation performed to a basic processing sub-unit can be repeatedly performed to each of its luma and chroma components. It should be noted that such division can be performed to further levels depending on processing needs. It should also be noted that different stages can divide the basic processing units using different schemes.

Figure 2A:
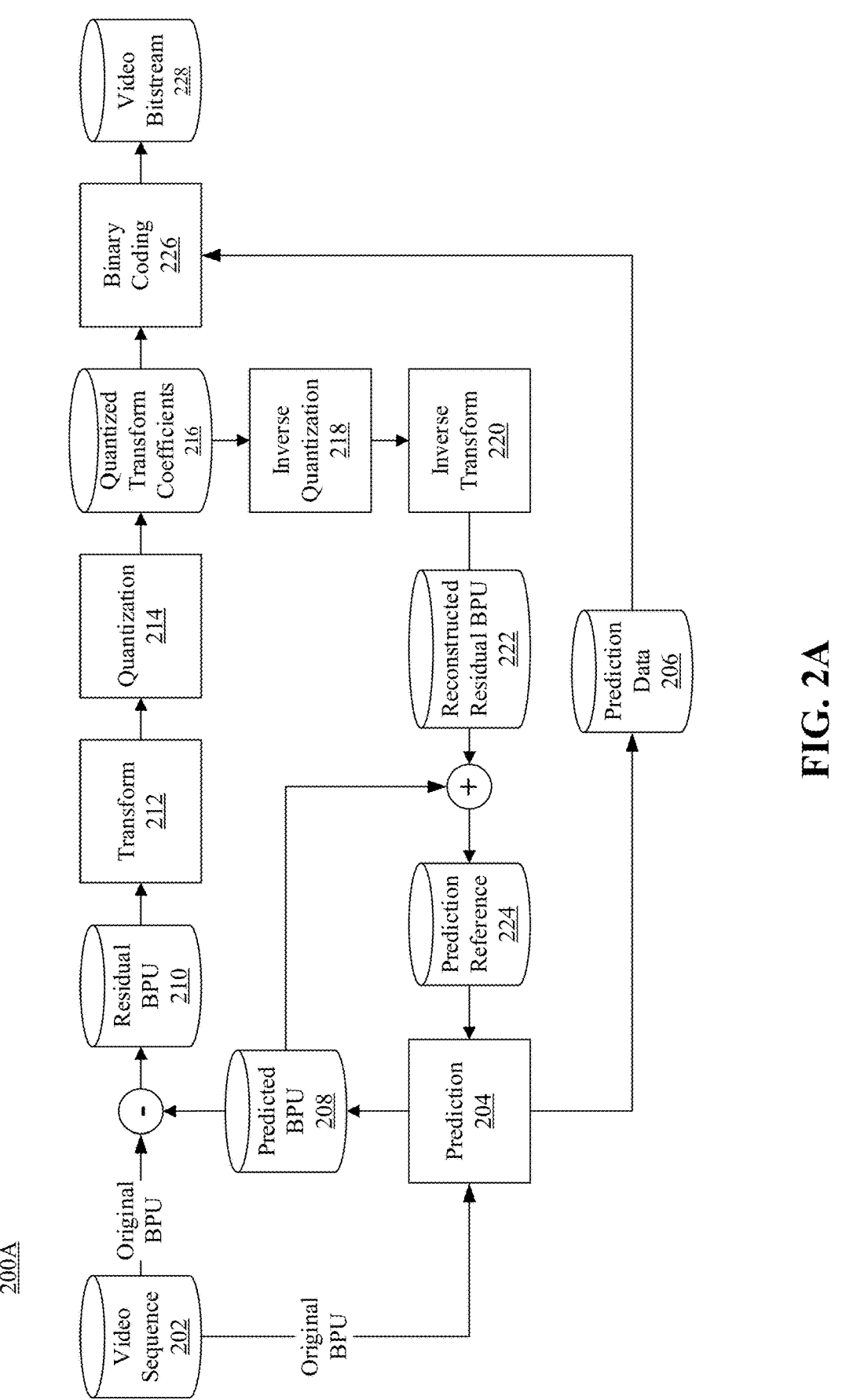
FIG. 2A is a schematic diagram illustrating an exemplary encoding process of a hybrid video coding system, consistent with embodiments of the disclosure.
Figure 2B:
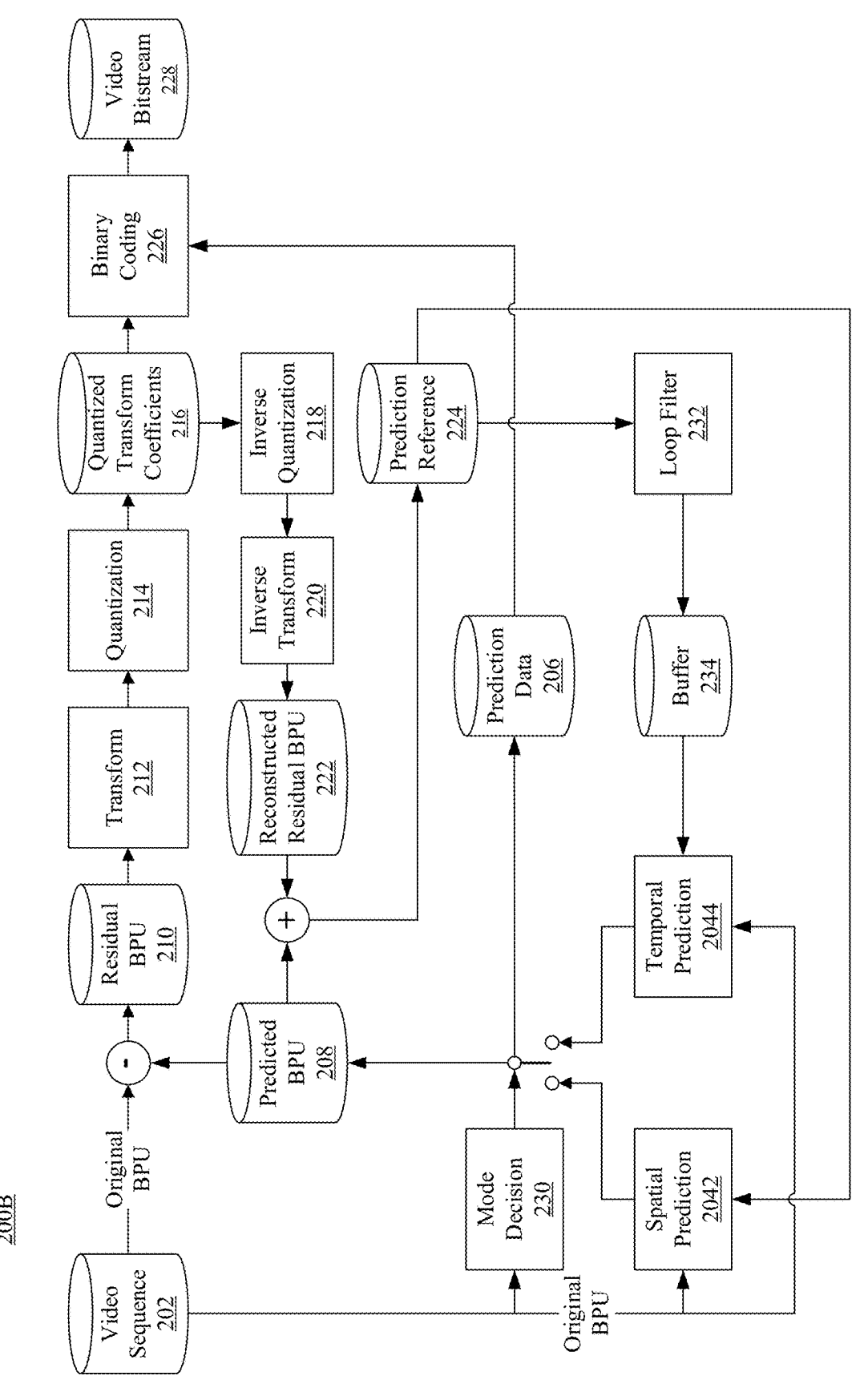
FIG. 2B is a schematic diagram illustrating another exemplary encoding process of a hybrid video coding system, consistent with embodiments of the disclosure.

For example, at a mode decision stage (an example of which is shown in FIG. 2B), the encoder can decide what prediction mode (e.g., intra-picture prediction or inter-picture prediction) to use for a basic processing unit, which can be too large to make such a decision. The encoder can split the basic processing unit into multiple basic processing sub-units (e.g., CUs as in H.265/HEVC or H.266/VVC), and decide a prediction type for each individual basic processing sub-unit.

For another example, at a prediction stage (an example of which is shown in FIGS. 2A-2B), the encoder can perform prediction operation at the level of basic processing sub-units (e.g., CUs). However, in some cases, a basic processing sub-unit can still be too large to process. The encoder can further split the basic processing sub-unit into smaller segments (e.g., referred to as "prediction blocks" or "PBs" in H.265/HEVC or H.266/VVC), at the level of which the prediction operation can be performed.

For another example, at a transform stage (an example of which is shown in FIGS. 2A-2B), the encoder can perform a transform operation for residual basic processing sub-units (e.g., CUs). However, in some cases, a basic processing sub-unit can still be too large to process. The encoder can further split the basic processing sub-unit into smaller segments (e.g., referred to as "transform blocks" or "TBs" in H.265/HEVC or H.266/VVC), at the level of which the transform operation can be performed. It should be noted that the division schemes of the same basic processing sub-unit can be different at the prediction stage and the transform stage. For example, in H.265/HEVC or H.266/VVC, the prediction blocks and transform blocks of the same CU can have different sizes and numbers.

In structure 110 of FIG. 1, basic processing unit 112 is further divided into 3×3 basic processing sub-units, the boundaries of which are shown as dotted lines. Different basic processing units of the same picture can be divided into basic processing sub-units in different schemes.

In some implementations, to provide the capability of parallel processing and error resilience to video encoding and decoding, a picture can be divided into regions for processing, such that, for a region of the picture, the encoding or decoding process can depend on no information from any other region of the picture. In other words, each region of the picture can be processed independently. By doing so, the codec can process different regions of a picture in parallel, thus increasing the coding efficiency. Also, when data of a region is corrupted in the processing or lost in network transmission, the codec can correctly encode or decode other regions of the same picture without reliance on the corrupted or lost data, thus providing the capability of error resilience. In some video coding standards, a picture can be divided into different types of regions. For example, H.265/HEVC and H.266/VVC provide two types of regions: "slices" and "tiles." It should also be noted that different pictures of video sequence 100 can have different partition schemes for dividing a picture into regions.

For example, in FIG. 1, structure 110 is divided into three regions 114, 116, and 118, the boundaries of which are shown as solid lines inside structure 110. Region 114 includes four basic processing units. Each of regions 116 and 118 includes six basic processing units. It should be noted that the basic processing units, basic processing sub-units, and regions of structure 110 in FIG. 1 are only examples, and the present disclosure does not limit embodiments thereof.

FIG. 2A illustrates a schematic diagram of an example encoding process 200A, consistent with embodiments of the disclosure. For example, the encoding process 200A can be performed by an encoder. As shown in FIG. 2A, the encoder can encode video sequence 202 into video bitstream 228 according to process 200A. Similar to video sequence 100 in FIG. 1, video sequence 202 can include a set of pictures (referred to as "original pictures") arranged in a temporal order. Similar to structure 110 in FIG. 1, each original picture of video sequence 202 can be divided by the encoder into basic processing units, basic processing sub-units, or regions for processing. In some embodiments, the encoder can perform process 200A at the level of basic processing units for each original picture of video sequence 202. For example, the encoder can perform process 200A in an iterative manner, in which the encoder can encode a basic processing unit in one iteration of process 200A. In some embodiments, the encoder can perform process 200A in parallel for regions (e.g., regions 114-118) of each original picture of video sequence 202.

In FIG. 2A, the encoder can feed a basic processing unit (referred to as an "original BPU") of an original picture of video sequence 202 to prediction stage 204 to generate prediction data 206 and predicted BPU 208. The encoder can subtract predicted BPU 208 from the original BPU to generate residual BPU 210. The encoder can feed residual BPU 210 to transform stage 212 and quantization stage 214 to generate quantized transform coefficients 216. The encoder can feed prediction data 206 and quantized transform coefficients 216 to binary coding stage 226 to generate video bitstream 228. Components 202, 204, 206, 208, 210, 212, 214, 216, 226, and 228 can be referred to as a "forward path." During process 200A, after quantization stage 214, the encoder can feed quantized transform coefficients 216 to inverse quantization stage 218 and inverse transform stage 220 to generate reconstructed residual BPU 222. The encoder can add reconstructed residual BPU 222 to predicted BPU 208 to generate prediction reference 224, which is used in prediction stage 204 for the next iteration of process 200A. Components 218, 220, 222, and 224 of process 200A can be referred to as a "reconstruction path." The reconstruction path can be used to ensure that both the encoder and the decoder use the same reference data for prediction.

The encoder can perform process 200A iteratively to encode each original BPU of the original picture (in the forward path) and generate predicted reference 224 for encoding the next original BPU of the original picture (in the reconstruction path). After encoding all original BPUs of the original picture, the encoder can proceed to encode the next picture in video sequence 202.

Referring to process 200A, the encoder can receive video sequence 202 generated by a video capturing device (e.g., a camera). The term "receive" used herein can refer to receiving, inputting, acquiring, retrieving, obtaining, reading, accessing, or any action in any manner for inputting data.

At prediction stage 204, at a current iteration, the encoder can receive an original BPU and prediction reference 224, and perform a prediction operation to generate prediction data 206 and predicted BPU 208. Prediction reference 224 can be generated from the reconstruction path of the previous iteration of process 200A. The purpose of prediction stage 204 is to reduce information redundancy by extracting prediction data 206 that can be used to reconstruct the original BPU as predicted BPU 208 from prediction data 206 and prediction reference 224.

Ideally, predicted BPU 208 can be identical to the original BPU. However, due to non-ideal prediction and reconstruction operations, predicted BPU 208 is generally slightly different from the original BPU. For recording such differences, after generating predicted BPU 208, the encoder can subtract it from the original BPU to generate residual BPU 210. For example, the encoder can subtract values (e.g., greyscale values or RGB values) of pixels of predicted BPU 208 from values of corresponding pixels of the original BPU. Each pixel of residual BPU 210 can have a residual value as a result of such subtraction between the corresponding pixels of the original BPU and predicted BPU 208. Compared with the original BPU, prediction data 206 and residual BPU 210 can have fewer bits, but they can be used to reconstruct the original BPU without significant quality deterioration. Thus, the original BPU is compressed.

To further compress residual BPU 210, at transform stage 212, the encoder can reduce spatial redundancy of residual BPU 210 by decomposing it into a set of two-dimensional "base patterns," each base pattern being associated with a "transform coefficient." The base patterns can have the same size (e.g., the size of residual BPU 210). Each base pattern can represent a variation frequency (e.g., frequency of brightness variation) component of residual BPU 210. None of the base patterns can be reproduced from any combinations (e.g., linear combinations) of any other base patterns. In other words, the decomposition can decompose variations of residual BPU 210 into a frequency domain. Such a decomposition is analogous to a discrete Fourier transform of a function, in which the base patterns are analogous to the base functions (e.g., trigonometry functions) of the discrete Fourier transform, and the transform coefficients are analogous to the coefficients associated with the base functions.

Different transform algorithms can use different base patterns. Various transform algorithms can be used at transform stage 212, such as, for example, a discrete cosine transform, a discrete sine transform, or the like. The transform at transform stage 212 is invertible. That is, the encoder can restore residual BPU 210 by an inverse operation of the transform (referred to as an "inverse transform"). For example, to restore a pixel of residual BPU 210, the inverse transform can be multiplying values of corresponding pixels of the base patterns by respective associated coefficients and adding the products to produce a weighted sum. For a video coding standard, both the encoder and decoder can use the same transform algorithm (thus the same base patterns). Thus, the encoder can record only the transform coefficients, from which the decoder can reconstruct residual BPU 210 without receiving the base patterns from the encoder. Compared with residual BPU 210, the transform coefficients can have fewer bits, but they can be used to reconstruct residual BPU 210 without significant quality deterioration. Thus, residual BPU 210 is further compressed.

The encoder can further compress the transform coefficients at quantization stage 214. In the transform process, different base patterns can represent different variation frequencies (e.g., brightness variation frequencies). Because human eyes are generally better at recognizing low-frequency variation, the encoder can disregard information of high-frequency variation without causing significant quality deterioration in decoding. For example, at quantization stage 214, the encoder can generate quantized transform coefficients 216 by dividing each transform coefficient by an integer value (referred to as a "quantization scale factor") and rounding the quotient to its nearest integer. After such an operation, some transform coefficients of the high-frequency base patterns can be converted to zero, and the transform coefficients of the low-frequency base patterns can be converted to smaller integers. The encoder can disregard the zero-value quantized transform coefficients 216, by which the transform coefficients are further compressed. The quantization process is also invertible, in which quantized transform coefficients 216 can be reconstructed to the transform coefficients in an inverse operation of the quantization (referred to as "inverse quantization").

Because the encoder disregards the remainders of such divisions in the rounding operation, quantization stage 214 can be lossy. Typically, quantization stage 214 can contribute the most information loss in process 200A. The larger the information loss is, the fewer bits the quantized transform coefficients 216 can need. For obtaining different levels of information loss, the encoder can use different values of the quantization parameter or any other parameter of the quantization process.

At binary coding stage 226, the encoder can encode prediction data 206 and quantized transform coefficients 216 using a binary coding technique, such as, for example, entropy coding, variable length coding, arithmetic coding, Huffman coding, context-adaptive binary arithmetic coding, or any other lossless or lossy compression algorithm. In some embodiments, besides prediction data 206 and quantized transform coefficients 216, the encoder can encode other information at binary coding stage 226, such as, for example, a prediction mode used at prediction stage 204, parameters of the prediction operation, a transform type at transform stage 212, parameters of the quantization process (e.g., quantization parameters), an encoder control parameter (e.g., a bitrate control parameter), or the like. The encoder can use the output data of binary coding stage 226 to generate video bitstream 228. In some embodiments, video bitstream 228 can be further packetized for network transmission.

Referring to the reconstruction path of process 200A, at inverse quantization stage 218, the encoder can perform inverse quantization on quantized transform coefficients 216 to generate reconstructed transform coefficients. At inverse transform stage 220, the encoder can generate reconstructed residual BPU 222 based on the reconstructed transform coefficients. The encoder can add reconstructed residual BPU 222 to predicted BPU 208 to generate prediction reference 224 that is to be used in the next iteration of process 200A.

It should be noted that other variations of the process 200A can be used to encode video sequence 202. In some embodiments, stages of process 200A can be performed by the encoder in different orders. In some embodiments, one or more stages of process 200A can be combined into a single stage. In some embodiments, a single stage of process 200A can be divided into multiple stages. For example, transform stage 212 and quantization stage 214 can be combined into a single stage. In some embodiments, process 200A can include additional stages. In some embodiments, process 200A can omit one or more stages in FIG. 2A.

FIG. 2B illustrates a schematic diagram of another example encoding process 200B, consistent with embodiments of the disclosure. Process 200B can be modified from process 200A. For example, process 200B can be used by an encoder conforming to a hybrid video coding standard (e.g., H.26x series). Compared with process 200A, the forward path of process 200B additionally includes mode decision stage 230 and divides prediction stage 204 into spatial prediction stage 2042 and temporal prediction stage 2044. The reconstruction path of process 200B additionally includes loop filter stage 232 and buffer 234.

Generally, prediction techniques can be categorized into two types: spatial prediction and temporal prediction. Spatial prediction (e.g., an intra-picture prediction or "intra prediction") can use pixels from one or more already coded neighboring BPUs in the same picture to predict the current BPU. That is, prediction reference 224 in the spatial prediction can include the neighboring BPUs. The spatial prediction can reduce the inherent spatial redundancy of the picture. Temporal prediction (e.g., an inter-picture prediction or "inter prediction") can use regions from one or more already coded pictures to predict the current BPU. That is, prediction reference 224 in the temporal prediction can include the coded pictures. The temporal prediction can reduce the inherent temporal redundancy of the pictures.

Referring to process 200B, in the forward path, the encoder performs the prediction operation at spatial prediction stage 2042 and temporal prediction stage 2044. For example, at spatial prediction stage 2042, the encoder can perform the intra prediction. For an original BPU of a picture being encoded, prediction reference 224 can include one or more neighboring BPUs that have been encoded (in the forward path) and reconstructed (in the reconstructed path) in the same picture. The encoder can generate predicted BPU 208 by extrapolating the neighboring BPUs. The extrapolation technique can include, for example, a linear extrapolation or interpolation, a polynomial extrapolation or interpolation, or the like. In some embodiments, the encoder can perform the extrapolation at the pixel level, such as by extrapolating values of corresponding pixels for each pixel of predicted BPU 208. The neighboring BPUs used for extrapolation can be located with respect to the original BPU from various directions, such as in a vertical direction (e.g., on top of the original BPU), a horizontal direction (e.g., to the left of the original BPU), a diagonal direction (e.g., to the down-left, down-right, up-left, or up-right of the original BPU), or any direction defined in the used video coding standard. For the intra prediction, prediction data 206 can include, for example, locations (e.g., coordinates) of the used neighboring BPUs, sizes of the used neighboring BPUs, parameters of the extrapolation, a direction of the used neighboring BPUs with respect to the original BPU, or the like.

For another example, at temporal prediction stage 2044, the encoder can perform the inter prediction. For an original BPU of a current picture, prediction reference 224 can include one or more pictures (referred to as "reference pictures") that have been encoded (in the forward path) and reconstructed (in the reconstructed path). In some embodiments, a reference picture can be encoded and reconstructed BPU by BPU. For example, the encoder can add reconstructed residual BPU 222 to predicted BPU 208 to generate a reconstructed BPU. When all reconstructed BPUs of the same picture are generated, the encoder can generate a reconstructed picture as a reference picture. The encoder can perform an operation of "motion estimation" to search for a matching region in a scope (referred to as a "search window") of the reference picture. The location of the search window in the reference picture can be determined based on the location of the original BPU in the current picture. For example, the search window can be centered at a location having the same coordinates in the reference picture as the original BPU in the current picture and can be extended out for a predetermined distance. When the encoder identifies (e.g., by using a pel-recursive algorithm, a block-matching algorithm, or the like) a region similar to the original BPU in the search window, the encoder can determine such a region as the matching region. The matching region can have different dimensions (e.g., being smaller than, equal to, larger than, or in a different shape) from the original BPU. Because the reference picture and the current picture are temporally separated in the timeline (e.g., as shown in FIG. 1), it can be deemed that the matching region "moves" to the location of the original BPU as time goes by. The encoder can record the direction and distance of such a motion as a "motion vector." When multiple reference pictures are used (e.g., as picture 106 in FIG. 1), the encoder can search for a matching region and determine its associated motion vector for each reference picture. In some embodiments, the encoder can assign weights to pixel values of the matching regions of respective matching reference pictures.

The motion estimation can be used to identify various types of motions, such as, for example, translations, rotations, zooming, or the like. For inter prediction, prediction data 206 can include, for example, locations (e.g., coordinates) of the matching region, the motion vectors associated with the matching region, the number of reference pictures, weights associated with the reference pictures, or the like.

For generating predicted BPU 208, the encoder can perform an operation of "motion compensation." The motion compensation can be used to reconstruct predicted BPU 208 based on prediction data 206 (e.g., the motion vector) and prediction reference 224. For example, the encoder can move the matching region of the reference picture according to the motion vector, in which the encoder can predict the original BPU of the current picture. When multiple reference pictures are used (e.g., as picture 106 in FIG. 1), the encoder can move the matching regions of the reference pictures according to the respective motion vectors and average pixel values of the matching regions. In some embodiments, if the encoder has assigned weights to pixel values of the matching regions of respective matching reference pictures, the encoder can add a weighted sum of the pixel values of the moved matching regions.

In some embodiments, the inter prediction can be unidirectional or bidirectional. Unidirectional inter predictions can use one or more reference pictures in the same temporal direction with respect to the current picture. For example, picture 104 in FIG. 1 is a unidirectional inter-predicted picture, in which the reference picture (e.g., picture 102) precedes picture 104. Bidirectional inter predictions can use one or more reference pictures at both temporal directions with respect to the current picture. For example, picture 106 in FIG. 1 is a bidirectional inter-predicted picture, in which the reference pictures (e.g., pictures 104 and 108) are at both temporal directions with respect to picture 104.

Still referring to the forward path of process 200B, after spatial prediction 2042 and temporal prediction stage 2044, at mode decision stage 230, the encoder can select a prediction mode (e.g., one of the intra prediction or the inter prediction) for the current iteration of process 200B. For example, the encoder can perform a rate-distortion optimization technique, in which the encoder can select a prediction mode to minimize a value of a cost function depending on a bit rate of a candidate prediction mode and distortion of the reconstructed reference picture under the candidate prediction mode. Depending on the selected prediction mode, the encoder can generate the corresponding predicted BPU 208 and predicted data 206.

In the reconstruction path of process 200B, if intra prediction mode has been selected in the forward path, after generating prediction reference 224 (e.g., the current BPU that has been encoded and reconstructed in the current picture), the encoder can directly feed prediction reference 224 to spatial prediction stage 2042 for later usage (e.g., for extrapolation of a next BPU of the current picture). The encoder can feed prediction reference 224 to loop filter stage 232, at which the encoder can apply a loop filter to prediction reference 224 to reduce or eliminate distortion (e.g., blocking artifacts) introduced during coding of the prediction reference 224. The encoder can apply various loop filter techniques at loop filter stage 232, such as, for example, deblocking, sample adaptive offsets, adaptive loop filters, or the like. The loop-filtered reference picture can be stored in buffer 234 (or "decoded picture buffer") for later use (e.g., to be used as an inter-prediction reference picture for a future picture of video sequence 202). The encoder can store one or more reference pictures in buffer 234 to be used at temporal prediction stage 2044. In some embodiments, the encoder can encode parameters of the loop filter (e.g., a loop filter strength) at binary coding stage 226, along with quantized transform coefficients 216, prediction data 206, and other information.

Figure 3A:
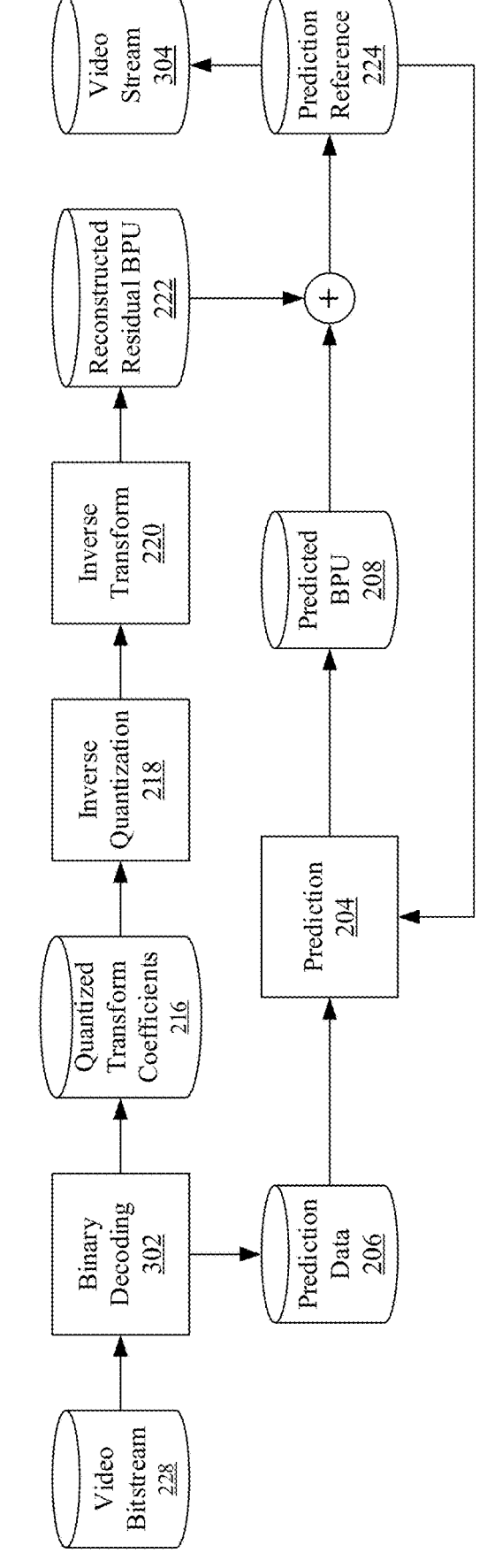
FIG. 3A is a schematic diagram illustrating an exemplary decoding process of a hybrid video coding system, consistent with embodiments of the disclosure.

FIG. 3A illustrates a schematic diagram of an example decoding process 300A, consistent with embodiments of the disclosure. Process 300A can be a decompression process corresponding to the compression process 200A in FIG. 2A. In some embodiments, process 300A can be similar to the reconstruction path of process 200A. A decoder can decode video bitstream 228 into video stream 304 according to process 300A. Video stream 304 can be very similar to video sequence 202. However, due to the information loss in the compression and decompression process (e.g., quantization stage 214 in FIGS. 2A-2B), generally, video stream 304 is not identical to video sequence 202. Similar to processes 200A and 200B in FIGS. 2A-2B, the decoder can perform process 300A at the level of basic processing units (BPUs) for each picture encoded in video bitstream 228. For example, the decoder can perform process 300A in an iterative manner, in which the decoder can decode a basic processing unit in one iteration of process 300A. In some embodiments, the decoder can perform process 300A in parallel for regions (e.g., regions 114-118) of each picture encoded in video bitstream 228.

In FIG. 3A, the decoder can feed a portion of video bitstream 228 associated with a basic processing unit (referred to as an "encoded BPU") of an encoded picture to binary decoding stage 302. At binary decoding stage 302, the decoder can decode the portion into prediction data 206 and quantized transform coefficients 216. The decoder can feed quantized transform coefficients 216 to inverse quantization stage 218 and inverse transform stage 220 to generate reconstructed residual BPU 222. The decoder can feed prediction data 206 to prediction stage 204 to generate predicted BPU 208. The decoder can add reconstructed residual BPU 222 to predicted BPU 208 to generate predicted reference 224. In some embodiments, predicted reference 224 can be stored in a buffer (e.g., a decoded picture buffer in a computer memory). The decoder can feed predicted reference 224 to prediction stage 204 for performing a prediction operation in the next iteration of process 300A.

The decoder can perform process 300A iteratively to decode each encoded BPU of the encoded picture and generate predicted reference 224 for encoding the next encoded BPU of the encoded picture. After decoding all encoded BPUs of the encoded picture, the decoder can output the picture to video stream 304 for display and proceed to decode the next encoded picture in video bitstream 228.

At binary decoding stage 302, the decoder can perform an inverse operation of the binary coding technique used by the encoder (e.g., entropy coding, variable length coding, arithmetic coding, Huffman coding, context-adaptive binary arithmetic coding, or any other lossless compression algorithm). In some embodiments, besides prediction data 206 and quantized transform coefficients 216, the decoder can decode other information at binary decoding stage 302, such as, for example, a prediction mode, parameters of the prediction operation, a transform type, parameters of the quantization process (e.g., quantization parameters), an encoder control parameter (e.g., a bitrate control parameter), or the like. In some embodiments, if video bitstream 228 is transmitted over a network in packets, the decoder can depacketize video bitstream 228 before feeding it to binary decoding stage 302.

Figure 3B:
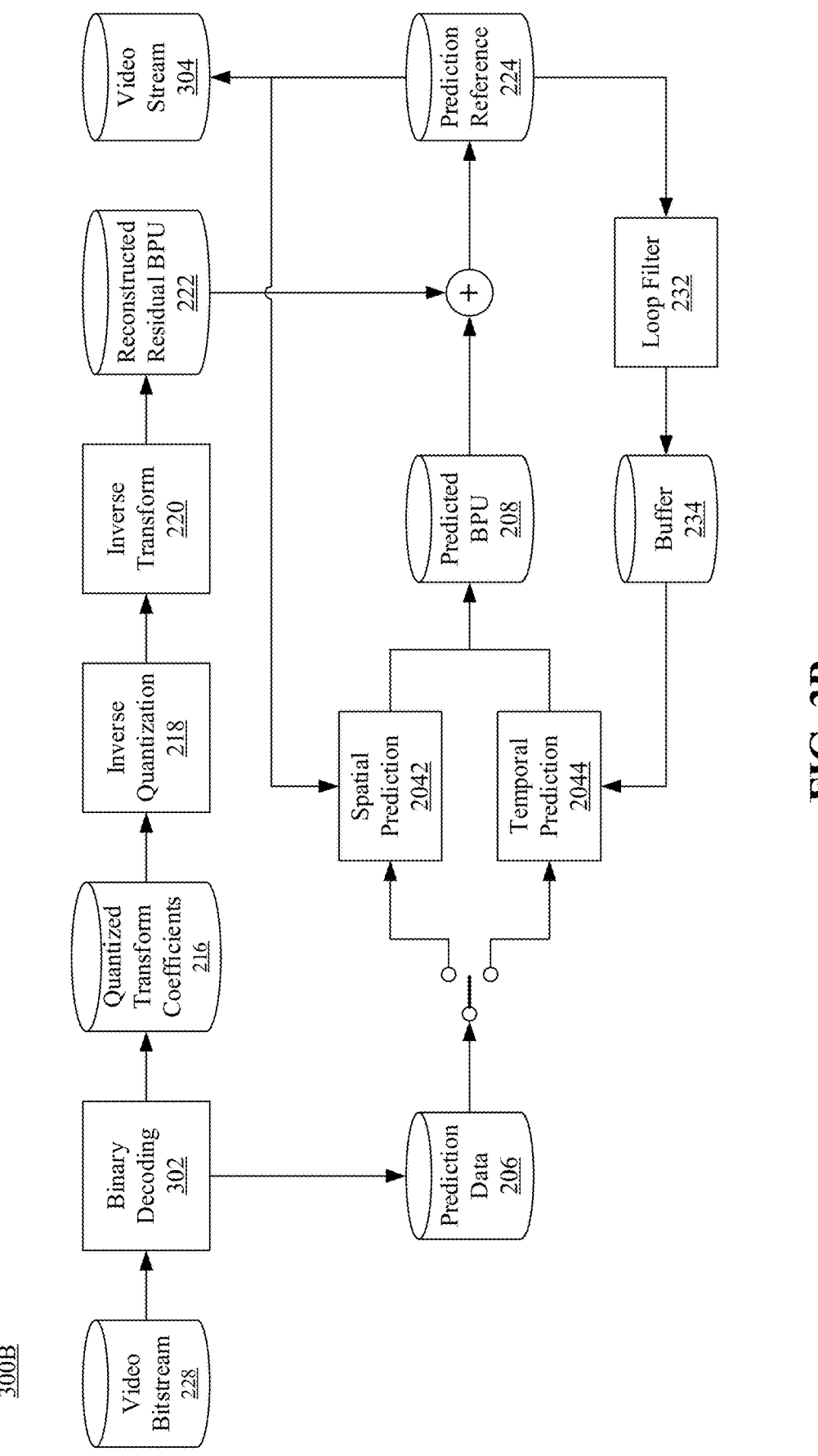
FIG. 3B is a schematic diagram illustrating another exemplary decoding process of a hybrid video coding system, consistent with embodiments of the disclosure.

FIG. 3B illustrates a schematic diagram of another example decoding process 300B, consistent with embodiments of the disclosure. Process 300B can be modified from process 300A. For example, process 300B can be used by a decoder conforming to a hybrid video coding standard (e.g., H.26x series). Compared with process 300A, process 300B additionally divides prediction stage 204 into spatial prediction stage 2042 and temporal prediction stage 2044, and additionally includes loop filter stage 232 and buffer 234.

In process 300B, for an encoded basic processing unit (referred to as a "current BPU") of an encoded picture (referred to as a "current picture") that is being decoded, prediction data 206 decoded from binary decoding stage 302 by the decoder can include various types of data, depending on what prediction mode was used to encode the current BPU by the encoder. For example, if intra prediction was used by the encoder to encode the current BPU, prediction data 206 can include a prediction mode indicator (e.g., a flag value) indicative of the intra prediction, parameters of the intra prediction operation, or the like. The parameters of the intra prediction operation can include, for example, locations (e.g., coordinates) of one or more neighboring BPUs used as a reference, sizes of the neighboring BPUs, parameters of extrapolation, a direction of the neighboring BPUs with respect to the original BPU, or the like. For another example, if inter prediction was used by the encoder to encode the current BPU, prediction data 206 can include a prediction mode indicator (e.g., a flag value) indicative of the inter prediction, parameters of the inter prediction operation, or the like. The parameters of the inter prediction operation can include, for example, the number of reference pictures associated with the current BPU, weights respectively associated with the reference pictures, locations (e.g., coordinates) of one or more matching regions in the respective reference pictures, one or more motion vectors respectively associated with the matching regions, or the like.

Based on the prediction mode indicator, the decoder can decide whether to perform a spatial prediction (e.g., the intra prediction) at spatial prediction stage 2042 or a temporal prediction (e.g., the inter prediction) at temporal prediction stage 2044. The details of performing such spatial prediction or temporal prediction are described in FIG. 2B and will not be repeated hereinafter. After performing such spatial prediction or temporal prediction, the decoder can generate predicted BPU 208. The decoder can add predicted BPU 208 and reconstructed residual BPU 222 to generate prediction reference 224, as described in FIG. 3A.

In process 300B, the decoder can feed predicted reference 224 to spatial prediction stage 2042 or temporal prediction stage 2044 for performing a prediction operation in the next iteration of process 300B. For example, if the current BPU is decoded using the intra prediction at spatial prediction stage 2042, after generating prediction reference 224 (e.g., the decoded current BPU), the decoder can directly feed prediction reference 224 to spatial prediction stage 2042 for later usage (e.g., for extrapolation of a next BPU of the current picture). If the current BPU is decoded using the inter prediction at temporal prediction stage 2044, after generating prediction reference 224 (e.g., a reference picture in which all BPUs have been decoded), the decoder can feed prediction reference 224 to loop filter stage 232 to reduce or eliminate distortion (e.g., blocking artifacts). The decoder can apply a loop filter to prediction reference 224, in a way as described in FIG. 2B. The loop-filtered reference picture can be stored in buffer 234 (e.g., a decoded picture buffer in a computer memory) for later use (e.g., to be used as an inter-prediction reference picture for a future encoded picture of video bitstream 228). The decoder can store one or more reference pictures in buffer 234 to be used at temporal prediction stage 2044. In some embodiments, prediction data can further include parameters of the loop filter (e.g., a loop filter strength). In some embodiments, prediction data includes parameters of the loop filter when the prediction mode indicator of prediction data 206 indicates that inter prediction was used to encode the current BPU.

Figure 4:
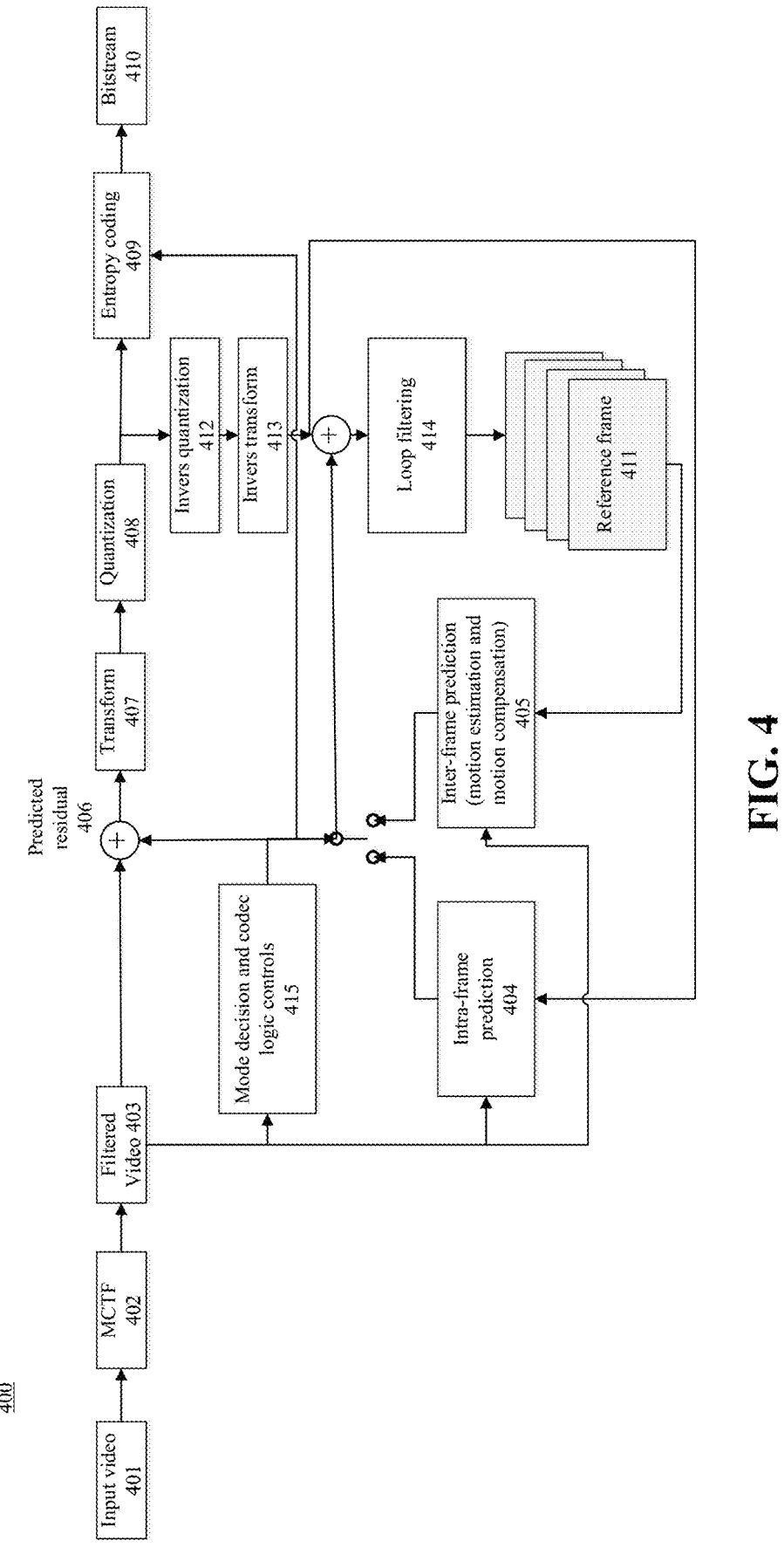
FIG. 4 is a schematic diagram of an application scenario of an exemplary motion compensation method, according to some embodiments of the present disclosure.

FIG. 4 is a schematic diagram of an application scenario of an exemplary motion compensation method, according to some embodiments of the present disclosure. The method in the embodiments of the present application can be applied to VVC of the video coding standard H.266. Specifically, it can be applied to the Motion Compensated Temporal Filter (MCTF) as shown in FIG. 4 and the motion estimation and motion compensation in inter-frame prediction. MCTF is applied in a pre-processing of VVC mainly to filter the input original video in the time domain through bilateral filters, which can effectively reduce video noise and improve coding efficiency.

The coding process 400 of H.266, as shown in FIG. 4, specifically includes: filtering an input video 401 by MCTF 402 to obtain a filtered video 403, performing intra-frame prediction 404 and inter-frame prediction 405 on the filtered video 403 to obtain a prediction residual 406, performing integer transform on the prediction residual 406, transforming 407 from the spatial domain to the frequency domain, then quantizing 408 the transformed coefficients, producing one-dimensional data from the quantized coefficients through a specific scanning method, and extracting information therefrom and entropy coding 409 the information to obtain a bit stream 410 and send the bit stream 410 to a user terminal for decoding and playback. In order to provide a reference frame 411 for prediction, the codec needs to reconstruct the image, perform inverse quantization 412 and inverse transform 413 through the inverse operation of encoding to obtain the residual image, then add the residual image with the prediction value obtained by intra-frame prediction 404 or inter-frame prediction 405, and then perform loop filtering 414 to obtain the reference frame 411. Mode decision and codec logic controls 415 are used to determine the mode and logic of coding based on specific needs.

Figure 5:
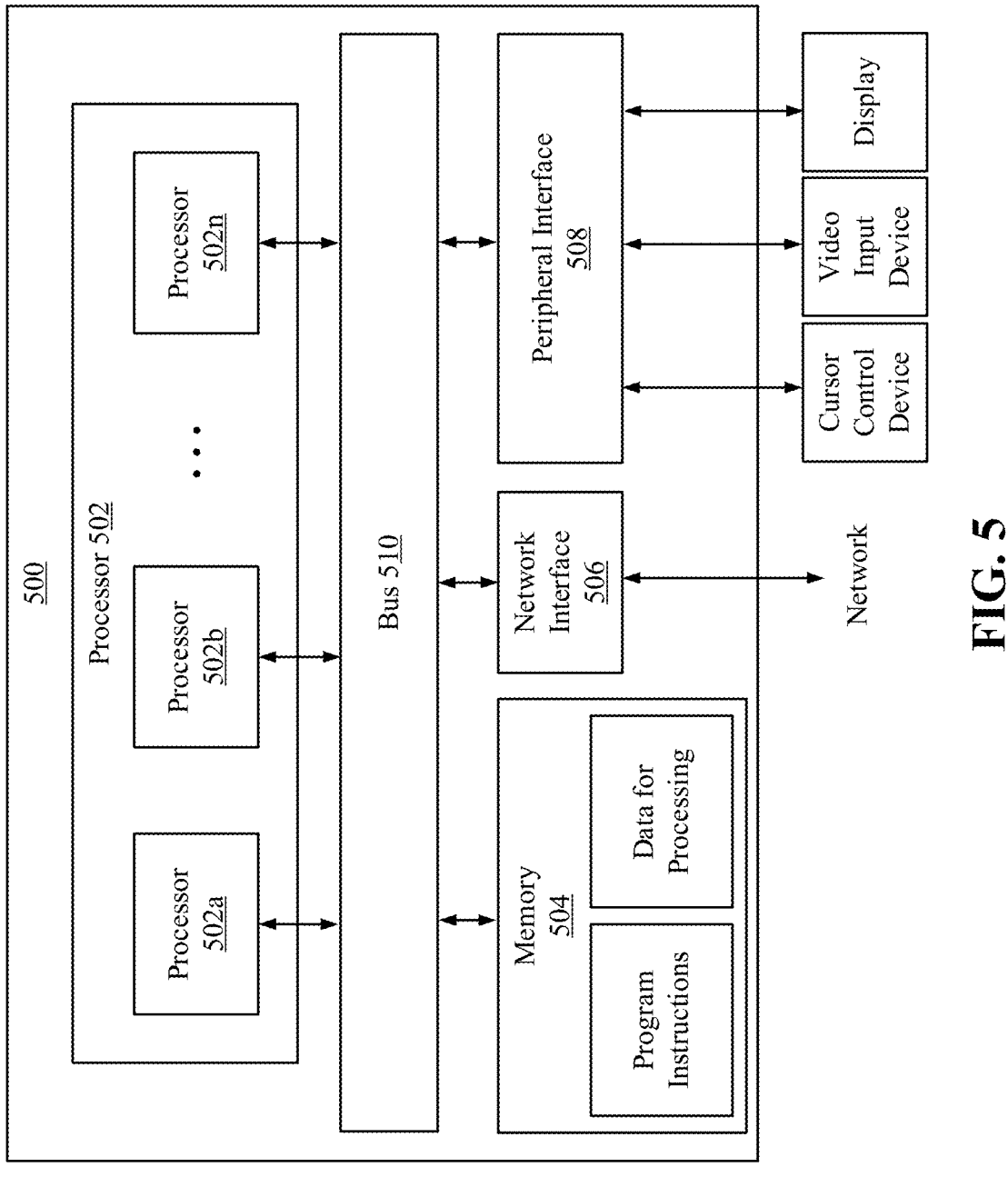
FIG. 5 is a block diagram of an exemplary apparatus for encoding or decoding a video, according to some embodiments of the present disclosure.

FIG. 5 is a block diagram of an example apparatus 500 for encoding or decoding a video, consistent with embodiments of the disclosure. As shown in FIG. 5, apparatus 500 can include processor 502. When processor 502 executes instructions described herein, apparatus 500 can become a specialized machine for video encoding or decoding. Processor 502 can be any type of circuitry capable of manipulating or processing information. For example, processor 502 can include any combination of any number of a central processing unit (or "CPU"), a graphics processing unit (or "GPU"), a neural processing unit ("NPU"), a microcontroller unit ("MCU"), an optical processor, a programmable logic controller, a microcontroller, a microprocessor, a digital signal processor, an intellectual property (IP) core, a Programmable Logic Array (PLA), a Programmable Array Logic (PAL), a Generic Array Logic (GAL), a Complex Programmable Logic Device (CPLD), a Field-Programmable Gate Array (FPGA), a System On Chip (SoC), an Application-Specific Integrated Circuit (ASIC), or the like. In some embodiments, processor 502 can also be a set of processors grouped as a single logical component. For example, as shown in FIG. 5, processor 502 can include multiple processors, including processor 502a, processor 502b, and processor 502n.

Apparatus 500 can also include memory 504 configured to store data (e.g., a set of instructions, computer codes, intermediate data, or the like). For example, as shown in FIG. 5, the stored data can include program instructions (e.g., program instructions for implementing the stages in processes 200A, 200B, 300A, 300B, or 400) and data for processing (e.g., video sequence 202, video bitstream 228, video stream 304, or input video 401). Processor 502 can access the program instructions and data for processing (e.g., via bus 510), and execute the program instructions to perform an operation or manipulation on the data for processing. Memory 504 can include a high-speed random-access storage device or a non-volatile storage device. In some embodiments, memory 504 can include any combination of any number of a random-access memory (RAM), a read-only memory (ROM), an optical disc, a magnetic disk, a hard drive, a solid-state drive, a flash drive, a security digital (SD) card, a memory stick, a compact flash (CF) card, or the like. Memory 504 can also be a group of memories (not shown in FIG. 5) grouped as a single logical component.

Bus 510 can be a communication device that transfers data between components inside apparatus 500, such as an internal bus (e.g., a CPU-memory bus), an external bus (e.g., a universal serial bus port, a peripheral component interconnect express port), or the like.

For ease of explanation without causing ambiguity, processor 502 and other data processing circuits are collectively referred to as a "data processing circuit" in this disclosure. The data processing circuit can be implemented entirely as hardware, or as a combination of software, hardware, or firmware. In addition, the data processing circuit can be a single independent module or can be combined entirely or partially into any other component of apparatus 500.

Apparatus 500 can further include network interface 506 to provide wired or wireless communication with a network (e.g., the Internet, an intranet, a local area network, a mobile communications network, or the like). In some embodiments, network interface 506 can include any combination of any number of a network interface controller (NIC), a radio frequency (RF) module, a transponder, a transceiver, a modem, a router, a gateway, a wired network adapter, a wireless network adapter, a Bluetooth adapter, an infrared adapter, a near-field communication ("NFC") adapter, a cellular network chip, or the like.

In some embodiments, optionally, apparatus 500 can further include peripheral interface 508 to provide a connection to one or more peripheral devices. As shown in FIG. 5, the peripheral device can include, but is not limited to, a cursor control device (e.g., a mouse, a touchpad, or a touchscreen), a keyboard, a display (e.g., a cathode-ray tube display, a liquid crystal display, or a light-emitting diode display), a video input device (e.g., a camera or an input interface coupled to a video archive), or the like.

It should be noted that video codecs (e.g., a codec performing process 200A, 200B, 300A, 300B, or 400) can be implemented as any combination of any software or hardware modules in apparatus 500. For example, some or all stages of process 200A, 200B, 300A, 300B, or 400 can be implemented as one or more software modules of apparatus 500, such as program instructions that can be loaded into memory 504. For another example, some or all stages of process 200A, 200B, 300A, 300B, or 400 can be implemented as one or more hardware modules of apparatus 500, such as a specialized data processing circuit (e.g., an FPGA, an ASIC, an NPU, or the like).

Figure 6:
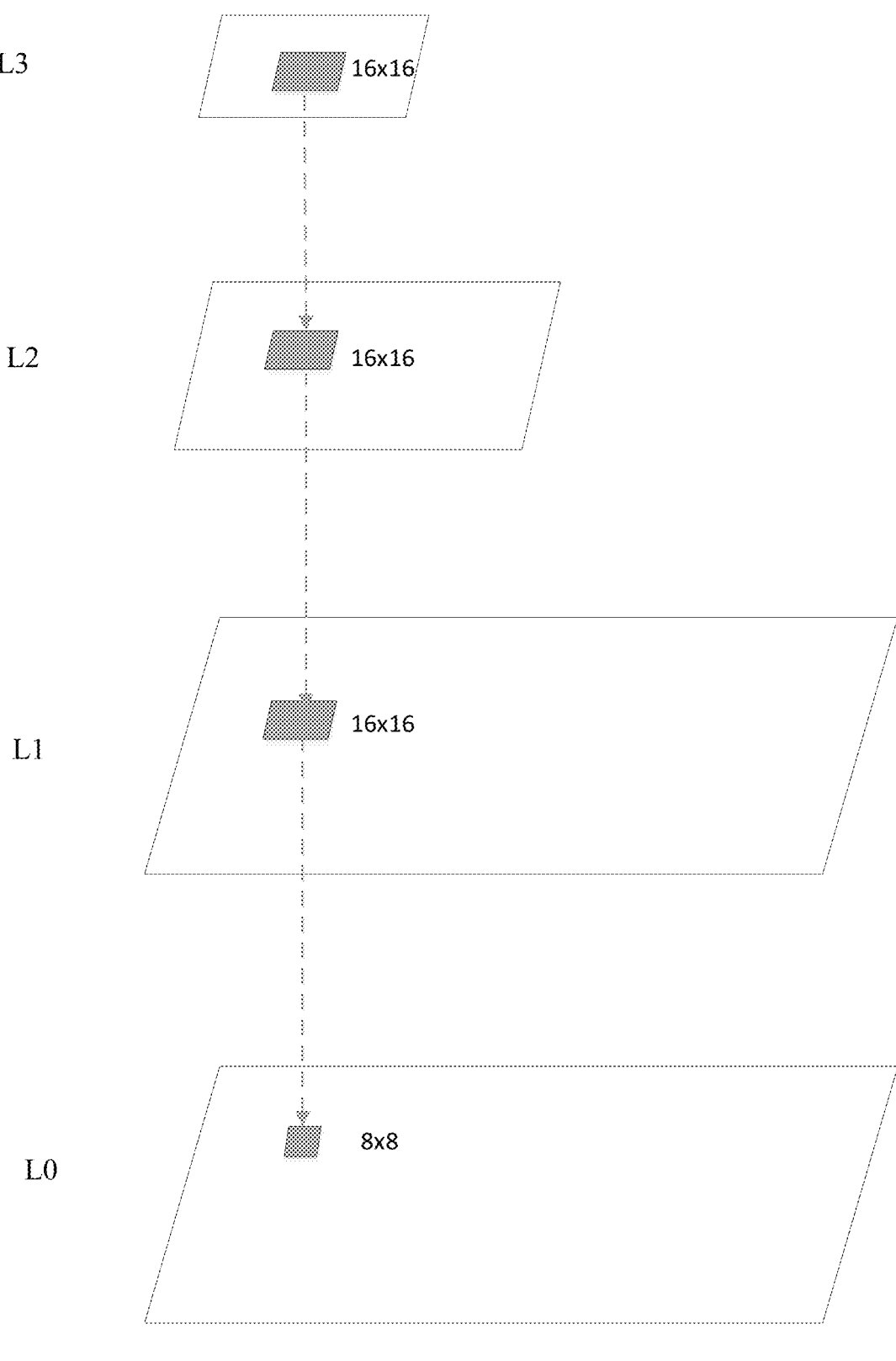
FIG. 6 is a schematic diagram of hierarchical motion estimation by Motion Compensated Temporal Filter (MCTF), according to some embodiments of the present disclosure.

FIG. 6 is a schematic diagram of hierarchical motion estimation by MCTF, according to some embodiments of the present disclosure. The MCTF adopts a hierarchical motion estimation scheme, as shown in FIG. 6, where L0 is the image with the original resolution, L1 is the down-sampled image of L0, and L2 is the down-sampled image of L1. The width and height of L1 are half of those of L0, and the width and height of L2 are half of those of L1. The calculation process of MCTF motion estimation is as follows:

(1) Performing integer pixel motion estimation on each 16×16 block in L3 to obtain the optimal motion vector MV0;

(2) Taking the motion vector MV0 as the initial value, performing the same integer pixel motion estimation on each 16×16 block in L2, to obtain an optimal motion vector MV1;

(3) Taking the motion vector MV1 as the initial value, performing the same integer pixel motion estimation on each 16×16 block in L1, to obtain the optimal motion vector MV2; and (4) Taking the motion vector MV2 as the initial value, performing integer pixel motion estimation and sub-pixel motion estimation on each 8×8 block in L0 sequentially, to obtain the final motion vector MV3. Motion compensation and bilateral filtering are performed with the motion vector MV3.

When performing integer pixel motion estimation and sub-pixel motion estimation at various layers, integer pixels are searched for within a certain range with an initial search point as the center, and the optimal integer pixel is selected. The sub-pixels are searched for surrounding the optimal integer pixel, and a matching block is determined based on the search results. Since the search range is fixed, all integer pixels are searched in the fixed search range, and sub-pixels are searched based on the search results of the integer pixels, which will produce many ineffective searches and the search is complex.

In order to solve the problems mentioned above, in a related art, all the integer pixels within a certain range as well as all the sub-pixels within the range of one integer pixel from the optimal integer pixel are sequentially traversed, or the search range of integer pixels is directly narrowed down, and the search of sub-pixels is directly reduced by a certain step size. Although this solution can reduce the complexity to a certain degree, it will result in a large performance loss (loss of, for example, peak signal-to-noise ratio and structural similarity) and will affect the coding quality.

In another related art, search is made by a step size in an order from large to small. This solution can reduce the complexity to a certain degree. However, for the hierarchical search by the MCTF, most step sizes are not very large. Therefore, this search method will waste some search time and cannot reduce the search time of the MCTF for integer pixels and sub-pixels to the greatest extent.

In view of this, embodiments of the present disclosure provide a motion compensation method. In this method, a motion vector of an initial search point in a reference frame of an adjacent block to a to-be-processed block in a to-be-processed image and a motion vector of the adjacent block are acquired; then a search range for the to-be-processed block is determined in the reference frame based on the motion vector of the initial search point and the motion vector of the adjacent block; and a target pixel is determined in the search range, and motion compensation is performed on the to-be-processed block based on the motion vector of the target pixel. In this example, the search range of the to-be-processed block is adaptively determined based on the motion vector of the initial search point of the adjacent block to the to-be-processed block and the motion vector of the adjacent block, so that ineffective searches can be avoided, the search complexity can be reduced, and the search time can be reduced.

FIG. 7 is a flow chart of an exemplary motion compensation method 700, according to some embodiments of the present disclosure. Method 700 includes steps 702 to 706.

At step 702, a motion vector of an initial search point in a reference frame of an adjacent block to a to-be-processed block in a to-be-processed image and a motion vector of the adjacent block are acquired.

At step 704, a search range is determined in the reference frame based on the motion vector of the initial search point and the motion vector of the adjacent block.

A step 706, a target pixel is determined in the search range, and motion compensation is performed on the to-be-processed block based on the motion vector of the target pixel.

This method can be applied to a computing device, which may include a server, a user terminal, and the like. The to-be-processed image may be any layer of image among the multi layers of image obtained by down-sampling the original image frame. Based on the optimal MV of the corresponding position of the to-be-processed block in the upper layer of image and the blocks in adjacent positions around the corresponding position (if there is no upper layer of image, the value of the optimal MV will be preset, for example, it may be zero), the initial search point of the to-be-processed block is determined in the reference frame.

For the adjacent blocks to the to-be-processed block for which the optimal pixel has been searched out, the motion vector of the initial search point of the adjacent block and the motion vector of the adjacent block are acquired. The motion vector of the adjacent block may be the motion vector of the target pixel corresponding to the adjacent block. The target pixel corresponding to the adjacent block is the pixel corresponding to the matching block of the adjacent block. The matching block of the adjacent block is the pixel block with the smallest match cost with respect to the adjacent block within the search range of the adjacent block.

Based on the motion vector of the initial search point of the adjacent block and the motion vector of the adjacent block, the search range of the to-be-processed block is determined. In the search range of the to-be-processed block, starting from the initial search point of the to-be-processed block, the target pixel corresponding to the to-be-processed block is searched for. The target pixel corresponding to the to-be-processed block is the pixel corresponding to the matching block of the to-be-processed block. For example, the target pixel may be the pixel in the upper left corner of the matching block, and the matching block of the to-be-processed block can be determined based on the target pixel. The target pixel may be an integer pixel or a sub-pixel.

The adjacent block may include at least one adjacent block above, below, left or right of the to-be-processed block.

Based on the optimal motion vector corresponding to the to-be-processed block, that is, the motion vector of the target pixel searched out in the search range, the matching block of the to-be-processed block is determined in the reference frame, and motion compensation is performed on the to-be-processed block.

In the motion compensation method provided by embodiments of the present disclosure, first, a motion vector of an initial search point in a reference frame of an adjacent block to a to-be-processed block in a to-be-processed image and a motion vector of the adjacent block are acquired; then a search range is determined in the reference frame based on the motion vector of the initial search point and the motion vector of the adjacent block; and a target pixel is determined in the search range, and motion compensation is performed on the to-be-processed block based on the motion vector of the target pixel. In this example, the search range of the to-be-processed block is adaptively determined based on the motion vector of the initial search point of the adjacent block to the to-be-processed block and the motion vector of the adjacent block, so that ineffective searches can be avoided, the search complexity can be reduced, and the search time can be reduced.

The way to determine the search range is described in detail as follows.

In some embodiments, determining the search range in the reference frame based on the motion vector of the initial search point and the motion vector of the adjacent block includes: determining a search side length based on a distance between the motion vector of the initial search point of the adjacent block and the motion vector of the adjacent block; and determining the search range in the reference frame based on the search side length of the search range.

In this example, the distance between the motion vector of the initial search point of the adjacent block and the motion vector of the adjacent block is acquired, and the search side length is determined based on the distance, and thus the search range is determined. Due to the correlation between adjacent blocks, the search side length of the search range of the current block is determined adaptively based on the motion vector of the initial search point of the adjacent block and the motion vector of the adjacent block, which can avoid many ineffective searches, reducing the complexity of pixel search while ensuring the rate-distortion performance.

In some embodiments, the number of adjacent blocks is 1, and determining the search side length of the search range based on the distance between the motion vector of the initial search point of the adjacent block and the motion vector of the adjacent block includes: using the distance between the motion vector of the initial search point of the adjacent block and the motion vector of the adjacent block as a search parameter value of the adjacent block; and determining the search side length of the search range based on the search parameter value of the adjacent block.

In practical applications, the distance between the motion vector of the initial search point of an adjacent block and the motion vector of the adjacent block can be selected as the search parameter value of the adjacent block. The search side length of the search range of the to-be-processed block is determined according to the search parameter value. The search range of the to-be-processed block is determined based on the search side length.

In an example, the search side length is determined according to the following formula:

$$\text{cur\_range} = \min(\text{prev\_range} + x, a) \qquad (1)$$

where cur_range represents the search side length of the to-be-processed block, prev_range represents the search parameter value of the adjacent block left of the to-be-processed block, and the search parameter value of the adjacent block is the distance between the motion vector of the initial search point of the adjacent block and the motion vector of the adjacent block; x is a preset redundancy threshold, a is a fixed parameter value, which can be set according to specific needs, and the value of x may be any value in [0, a]. In this example, a=16. Compared with the side length of 16 of a fixed search range in the related art, this method reduces the search range and avoids ineffective searches to a certain extent. The parameter value of the search range of the to-be-processed block may also be obtained by multiplying the distance between the motion vector of the initial search point of the adjacent block and the motion vector of the adjacent block by a redundancy threshold, and then the search range of the to-be-processed block is further determined.

In some embodiments, there are multiple adjacent blocks, and determining the search side length of the search range based on the distance between the motion vector of the initial search point of the adjacent block and the motion vector of the adjacent block includes: acquiring distances between the motion vectors of the respective initial search points corresponding to multiple adjacent blocks and the motion vectors of the adjacent blocks; obtaining the search parameter value by calculating a weighted sum of the multiple distances; and determining the search side length of the search range based on the search parameter value.

In practical applications, the distances between the motion vectors of the respective initial search points corresponding to multiple adjacent blocks and the motion vectors of the adjacent blocks may also be calculated. The search parameter value is determined by calculating a weighted sum of the multiple distances; and the search side length of the search range of the to-be-processed block is determined based on the search parameter value, where the respective weights for the adjacent blocks may be configured according to specific needs.

For example, the search parameter value prev_range in formula (1) can be calculated by calculating a weighted sum of the respective distances corresponding to the multiple adjacent blocks.

After the search side length of the search range of the to-be-processed block is determined, a square area obtained with the initial search point of the to-be-processed block as the center and the search side length as the side length is the search range of the to-be-processed block. For example, the search side length of the search range of the to-be-processed block is 5, and the square area of 5 pixels×5 pixels with the initial search point of the to-be-processed block as the center is the search range of the to-be-processed block. In this way, as the search parameter value of the adjacent block varies continuously, a search range of the to-be-processed block with a dynamically varying size can be adaptively obtained. Compared with the method of fixed-size search range in the related art, ineffective searches can be avoided, search complexity can be reduced and search time can be reduced.

In some embodiments, in step 706, determining the target pixel in the search range includes: in the search range, starting from the initial search point of the to-be-processed block, searching for the optimal integer pixel with the diamond search method; searching for the optimal sub-pixel with the diamond search method with the searched optimal integer pixel as the center of the diamond; and determining the target pixel between the optimal integer pixel and the optimal sub-pixel.

In practical applications, first, starting from the initial search point of the to-be-processed block, the optimal integer pixel is searched for in the search range with the diamond search method; the optimal sub-pixel is searched for with the optimal integer pixel as the center of the diamond; and between the optimal integer pixel and the optimal sub-pixel, the pixel corresponding to the pixel block with the smallest matching cost with respect to the to-be-processed block is selected as the target pixel. In this embodiment, compared with searching all pixels sequentially in a fixed search range in the related art, a diamond search method is used to search integer pixels and sub-pixels, which can greatly reduce the search complexity while ensuring the performance.

In some embodiments, in the search range, starting from the initial search point of the to-be-processed block, searching for the optimal integer pixel with the diamond search method includes: using the initial search point as the center of the diamond, determining the matching costs of the respective pixel blocks corresponding to the center of the diamond and the adjacent integer pixels above, below, left, and right of the center of the diamond with respect to the to-be-processed block, and using the integer pixel corresponding to the pixel block with the smallest matching cost with respect to the to-be-processed block as the optimal integer pixel of the current round of diamond search; and using the optimal integer pixel of the current round of diamond search as the center of the diamond of the next round of diamond search to search for the optimal integer pixel of the next round.

The matching cost corresponding to each point is calculated based on the pixel value of each pixel in the pixel block with this point as the upper left point in the reference frame and the pixel value of each pixel in the to-be-processed block. The matching cost measures the degree of similarity between pixels. The greater the matching cost is, the less similar the respective pixels of two images are.

In the first round of diamond search, using the initial search point as the center of the diamond in the diamond search, the matching costs of the respective pixel blocks corresponding to the center of the diamond and the adjacent integer pixels above, below, left, and right of the center of the diamond with respect to the to-be-processed block are calculated, and the integer pixel corresponding to the pixel block with the smallest matching cost is used as the optimal integer pixel of the current round of diamond search. In each subsequent round of search, the optimal integer pixel searched out in the previous round of search can be used as the center of the diamond to determine a further diamond and continue with the diamond search.

Figure 8:
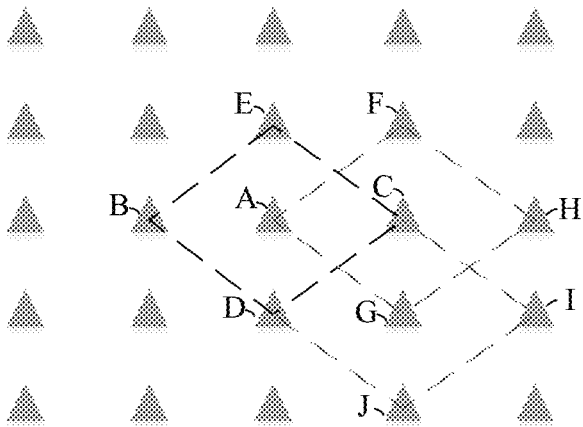
FIG. 8 is a schematic diagram of an exemplary diamond search, according to some embodiments of the present disclosure.

FIG. 8 is a schematic diagram of an exemplary diamond search, according to some embodiments of the present disclosure. In an example, as shown in FIG. 8, the points searched are integer pixels. Each triangle in the figure represents an integer pixel. In this example, the search range is a 5×5 area. If it is the first round of search, using the initial search point A as the center of the diamond, the respective matching costs corresponding to the center a of the diamond and the adjacent integer pixels E, D, B, and C respectively above, below, left, and right of the center of the diamond are calculated. The respective matching costs corresponding to these 5 points are compared and the point with the smallest matching cost is used as the optimal integer pixel of the current round of diamond search. If the optimal integer pixel of the current round of diamond search is point C, then in the next round of diamond search, the point C is used as the center of the diamond to search for the five points A, C, H, G, and F, and determine g as the optimal integer pixel by calculating the matching costs. Then in the further next round, point G is used as the center of the diamond to calculate the five points D, G, I, C and J, and so on, until the final optimal integer pixel is determined in the search range.

In some embodiments, in the search range, starting from the initial search point of the to-be-processed block, searching for the optimal integer pixel with the diamond search method includes: in the search range, starting from the initial search point of the to-be-processed block, determining the removal point of the next round of diamond search based on the matching costs of the respective pixel blocks corresponding to multiple integer pixels of the current round of diamond search with respect to the to-be-processed block;

and in the next round of diamond search, searching for the optimal integer pixel among the integer pixels other than the removal point.

In practical applications, it is not necessary to search every pixel in the search range. The optimal integer pixel of the current round of diamond search can be determined based on the respective matching costs corresponding to the integer pixels of the current round of diamond search, and the removal point in the next round, that is, the point that do not need to be searched, are determined based on the position of the optimal integer pixel, thereby reducing the search time.

The way to determine the removal point of the next round is described in detail as follows.

In some embodiments, in the search range, starting from the initial search point of the to-be-processed block, determining the removal point of the next round of diamond search based on the matching costs of the respective pixel blocks corresponding to multiple integer pixels of the current round of diamond search with respect to the to-be-processed block includes: in the search range, starting from the initial search point of the to-be-processed block, determining the optimal integer pixel of the current round of diamond search based on the matching costs of the respective pixel blocks corresponding to the integer pixels of the current round of diamond search with respective to the to-be-processed block; if the optimal integer pixel of the current round of diamond search is the adjacent integer pixel left or right of the center of the diamond, then determining the removal point of the next round of diamond search to be the adjacent integer pixel above or below the center of the diamond with the greater matching cost; and if the optimal integer pixel of the current round of diamond search is the adjacent integer pixel above or below the center of the diamond, then determining the removal point of the next round of diamond search to be the adjacent integer pixel left or right of the center of the diamond with the greater matching cost.

In practical applications, starting from the initial search point of the to-be-processed block, the respective matching costs corresponding to the five points, i.e., the center of the diamond and the points left, right, above and below the center of the diamond are calculated, and the point with the smallest matching cost is used as the optimal integer pixel. If the optimal integer pixel is the adjacent integer pixel left or right of the center of the diamond, then the respective matching costs corresponding to the adjacent integer pixels above and below the center of the diamond are compared. Based on the position corresponding to the point with the greater matching cost, the position of the removal point in the next round of search is determined. For example, if the matching cost of the adjacent pixel above is greater, then in the next round of diamond search, the adjacent point above the center of the diamond is used as the removal point, and the matching cost of this point is not calculated, while the matching costs of other points in the diamond are calculated, thus reducing the calculation time.

If the optimal integer pixel is the adjacent integer pixel above or below the center of the diamond, then the respective matching costs corresponding to the adjacent integer pixels left and right of the center of the diamond are compared. Based on the position corresponding to the point with the greater matching cost, the position of the removal point in the next round of search is determined. For example, if the matching cost of the adjacent pixel left is greater, then in the next round of diamond search, the adjacent point left of the center of the diamond is used as the removal point, and the matching cost of this point is not calculated, while the matching costs of other points in the diamond are calculated, thus reducing the calculation time.

The way to stop the search during the search for the optimal pixel is described in detail as follows.

In some embodiments, the method 700 further includes: if the center of the diamond of the current round of diamond search is the optimal integer pixel, the currently obtained optimal integer pixel is used as the optimal integer pixel of the to-be-processed block.

In practical applications, if the center of the diamond of the current round of diamond search is the optimal integer pixel, that is, the matching cost of the center of the diamond is the smallest, then the search will not continue, and the optimal integer pixel of the to-be-processed block is obtained. Similarly, in searching for the optimal sub-pixel, if the center of the diamond of the current round of diamond search is the optimal sub-pixel, that is, the matching cost of the center of the diamond is the smallest, then the search will not continue, and the optimal sub-pixel of the to-be-processed block is obtained. Then the respective matching costs corresponding to the optimal integer pixel and the optimal sub-pixel are compared, and the one with the smallest matching cost is used as the target pixel.

In some embodiments, the method 700 further includes: if a degree of approximation between the maximum and minimum matching costs of the current round of diamond search meets a preset condition, and the number of search stoppings exceeds a preset threshold, then using the currently obtained optimal integer pixel as the optimal integer pixel of the to-be-processed block.

The initial value of the number of search stoppings is a preset value and continues to increase when the accumulation condition is met during the search process, until the degree of approximation between the maximum and minimum matching costs of the current round of diamond search meets the preset condition, and the number of search stoppings exceeds the preset threshold, then the next round of integer pixel search will be stopped.

The preset condition may be that min_value×x is greater than max_value of the matching cost, where x is a preset value and can be set according to specific needs.

Figure 9:
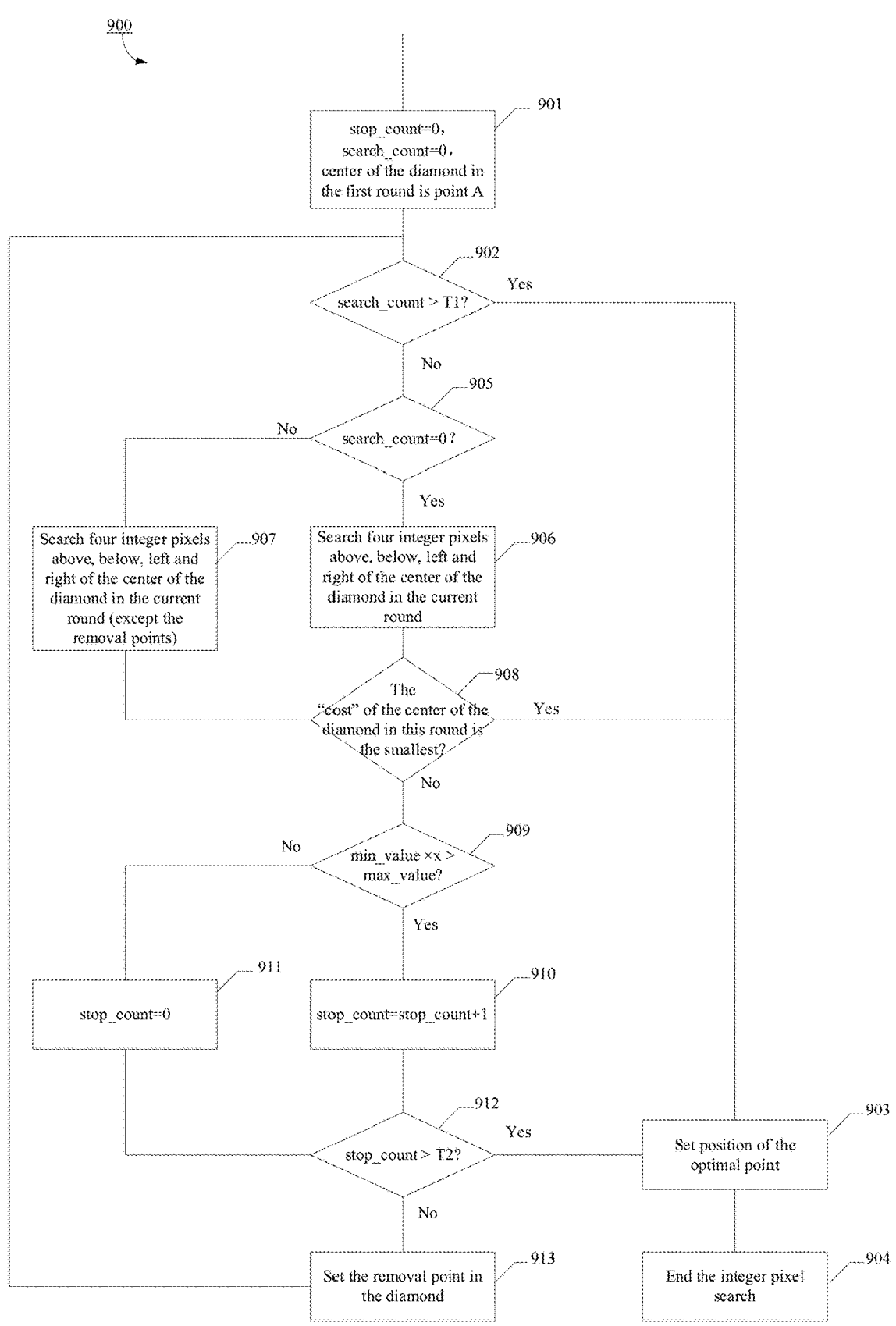
FIG. 9 is a schematic diagram of an exemplary integer pixel search process, according to some embodiments of the present disclosure.

The integer pixel search process of the technical solution of the present disclosure is explained below with a specific example. Referring to FIG. 8 and FIG. 9, the integer pixel search method provided by the embodiments of the present disclosure includes steps 901 to 913.

As a start, at step 901, the number of search stoppings stop_count is set to 0, the number of search rounds search_count is set to 0, and the center of the diamond in the first round is point A in FIG. 8.

At step 902, it is determined whether the value of search_count is greater than T1, where T1 is a preset value that is greater than or equal to 0. If the value of search_count is greater than T1, method 900 turns to steps 903 and 904, taking the optimal point of the previous round as the final optimal point of the integer pixel search and stopping the integer pixel search.

If the value of search_count is equal to or less than T1, method 900 turns to step 905, determining whether search_count is 0. If search_count is equal to 0, that is, it's the first round of search, method 900 turns to step 906, searching four integer pixels above, below, left and right of the center of the diamond in current round to calculate the matching cost "cost" for each integer pixel. If search_count is not equal to 0, that is, it's not the first round of search, method 900 turns to step 907, searching four integer pixels above, below, left and right of the center of the diamond in current round (except the removal point.) to calculate the matching cost "cost" for each integer pixel.

At step 908, it is determined whether the "cost" of the center of the diamond in this round is the smallest. If the "cost" of the center of the diamond in current round is the smallest, method 900 turns to steps 903 and 904 determining the center of the diamond is set as the optimal integer pixel and exiting the integer pixel search process. If the "cost" of the center of the diamond in current round is not the smallest, method 900 turns to step 909.

At step 909, the maximum value max_value and the minimum value min_value of the "cost" of the center of the diamond and the four integer pixels above, below, left, and right are determined. If min_value×x is greater than max_value, it turns to step 910, adding 1 to the value of stop_count; otherwise, method 900 turns to step 911, changing the value of stop_count to 0. The value of x is a preset value, which may be any value in [1, 2], including decimals. After multiplying min_value by x, the resultant value is compared with max_value to determine whether min_value is approximate to max_value.

At step 912, it is determined whether stop_count is greater than T2, where T2 is a preset value greater than 0. If stop_count is greater than T2, method 900 turns to steps 903 and 904, setting the position of the optimal integer pixel, and using the pixel with the smallest "cost" among the four integer pixels in the current diamond as the optimal point of the integer pixel search, and stopping the integer pixel search. If stop_count is equal to or less than T2, method 900 turns to step 913.

At step 913, the removal point in the diamond is set. If the optimal point in current round of diamond search (A, B, C, D, and E in FIG. 8) is the left or right position in the diamond (point B or C in FIG. 8), then compare the "costs" of the upper and lower points (points D and E in FIG. 8). If the "cost" of the upper point e is greater than the "cost" of the lower point D, then the upper point of the next round of diamond search (if the optimal point of the current round of search is point C, then the search points of the next round are A, C, H, F, and G, the upper point being point F) is used as the removal point, otherwise the lower point (point G in FIG. 8) is used as the removal point. If the optimal point in the current round is the upper and lower positions in the diamond, then removal is done in the same way. Then the optimal point in current round of search is taken as the center of the next round of diamond search, and the value of search_count is added with 1. Then, method 900 turns to step 902, and continues searching until the end condition is met and the optimal integer pixel is obtained.

When searching sub-pixels, the same search method can be adopted, then the pixel with smaller matching cost of the optimal integer pixel and the optimal sub-pixel is used as the optimal pixel, and the motion vector corresponding to the optimal pixel is used as the optimal motion vector.

Figure 10:
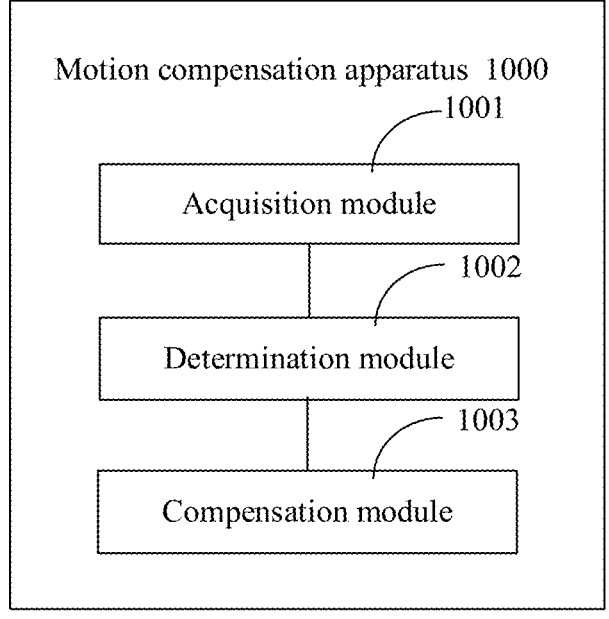
FIG. 10 is a structural block diagram of an exemplary motion compensation apparatus, according to some embodiments of the present disclosure.

Corresponding to the application scenarios and approaches of the method provided by the embodiments of the present application, the embodiments of the present disclosure further provide a motion compensation apparatus. FIG. 10 is a structural block diagram of an exemplary motion compensation apparatus 1000, according to some embodiments of the present disclosure. Apparatus 1000 includes: an acquisition module 1001, a determination module 1002, and a compensation module 1003.

Acquisition module 1001 includes circuitry configured to acquire a motion vector of an initial search point in a reference frame of an adjacent block to a to-be-processed block in a to-be-processed image and a motion vector of the adjacent block.

Determination module 1002 includes circuitry configured to determine a search range in the reference frame based on the motion vector of the initial search point and the motion vector of the adjacent block.

Compensation module 1003 includes circuitry configured to determine a target pixel in the search range, and perform motion compensation on the to-be-processed block based on the motion vector of the target pixel.

In the motion compensation apparatus provided by embodiments of the present disclosure, a motion vector of an initial search point in a reference frame of an adjacent block to a to-be-processed block in a to-be-processed image and a motion vector of the adjacent block are acquired; then a search range is determined in the reference frame based on the motion vector of the initial search point and the motion vector of the adjacent block; and a target pixel is determined in the search range, and motion compensation is performed on the to-be-processed block based on the motion vector of the target pixel. In this embodiment, the search range of the to-be-processed block is adaptively determined based on the motion vector of the initial search point of the adjacent block to the to-be-processed block and the motion vector of the adjacent block, so that ineffective searches can be avoided, the search complexity can be reduced and the search time can be reduced.

In some embodiments, the determination module 1002 further includes circuitry configured to: determine the parameter value of the search range based on the distance between the motion vector of the initial search point of the adjacent block and the motion vector of the adjacent block; and determine the search range in the reference frame based on the search side length of the search range.

In some embodiments, the number of the adjacent blocks is 1, and the determination module 1002 further includes circuitry configure to when determining the search side length of the search range based on the distance between the motion vector of the initial search point of the adjacent block and the motion vector of the adjacent block, use the distance between the motion vector of the initial search point of the adjacent block and the motion vector of the adjacent block as the search parameter value of the adjacent block; and determine the search side length of the search range based on the search parameter value of the adjacent block.

In some embodiments, the determination module 1002 further includes circuitry configure to when acquiring the distance between the motion vector of the initial search point of the adjacent block and the motion vector of the adjacent block and determining the search side length of the search range based on the distance, acquire the distances between the motion vectors of the respective initial search points corresponding to the multiple adjacent blocks and the motion vectors of the adjacent blocks; obtain the search parameter value by calculating a weighted sum of the multiple distances; and determine the search side length of the search range based on the search parameter value.

In some embodiments, the compensation module 1003 further includes circuitry configure to, when determining the target pixel in the search range, in the search range, starting from the initial search point of the to-be-processed block, search for the optimal integer pixel with a diamond search method; using the searched optimal integer pixel as the center of the diamond, search for the optimal sub-pixel with the diamond search method; and determine the target pixel between the optimal integer pixel and the optimal sub-pixel.

In some embodiments, the compensation module 1003 further includes circuitry configure to, when, in the search range, starting from the initial search point of the to-be-processed block, searching for the optimal integer pixel with a diamond search method, using the initial search point of the to-be-processed block as the center of the diamond, determine the matching costs of the respective pixel blocks corresponding to the center of the diamond and the adjacent integer pixels above, below, left, and right of the center of the diamond with respect to the to-be-processed block, and use the integer pixel corresponding to the pixel block with the smallest matching cost with respect to the to-be-processed block as the optimal integer pixel of the current round of diamond search; and using the optimal integer pixel of the current round of diamond search as the center of the diamond of the next round of diamond search, searching for the optimal integer pixel of the next round.

In some embodiments, the compensation module 1003 further includes circuitry configure to, when, in the search range, starting from the initial search point of the to-be-processed block, searching for the optimal integer pixel with a diamond search method, in the search range, starting from the initial search point of the to-be-processed block, determine the removal point of the next round of diamond search based on the matching costs of the respective pixel blocks corresponding to multiple integer pixels of the current round of diamond search with respect to the to-be-processed block; and in the next round of diamond search, search for the optimal integer pixel among the integer pixels other than the removal point.

In some embodiments, the compensation module 1003 further includes circuitry configure to, when, in the search range, starting from the initial search point of the to-be-processed block, determining the removal point of the next round of diamond search based on the matching costs of the respective pixel blocks corresponding to integer pixels of the current round of diamond search with respect to the to-be-processed block, in the search range, starting from the initial search point of the to-be-processed block, determine the optimal integer pixel of the current round of diamond search based on the matching costs of the respective pixel blocks corresponding to the multiple integer pixels of the current round of diamond search with respect to the to-be-processed block; and if the optimal integer pixel of the current round of diamond search is the adjacent integer pixel left or right of the center of the diamond, then determine the removal point of the next round of diamond search to be the adjacent integer pixel above or below the center of the diamond with the greater matching cost; and if the optimal integer pixel of the current round of diamond search is the adjacent integer pixel above or below the center of the diamond, then determining the removal point of the next round of diamond search to be the adjacent integer pixel left or right of the center of the diamond with the greater matching cost.

In some embodiments, the apparatus 1000 further includes circuitry configure to: if the center of the diamond of the current round of diamond search is the optimal integer pixel, use the currently obtained optimal integer pixel as the optimal integer pixel of the to-be-processed block.

In some embodiments, the apparatus 1000 further includes circuitry configure to: if the degree of approximation between the maximum and minimum matching costs of the current round of diamond search meets a preset condition, and the number of search stoppings exceeds a preset threshold, then use the currently obtained optimal integer pixel as the optimal integer pixel of the to-be-processed block.

The functions of various modules in various devices of the embodiments of the present disclosure can be found in the corresponding description of the above method, and they provide corresponding beneficial effects, which will not be described again here.

Figure 11:
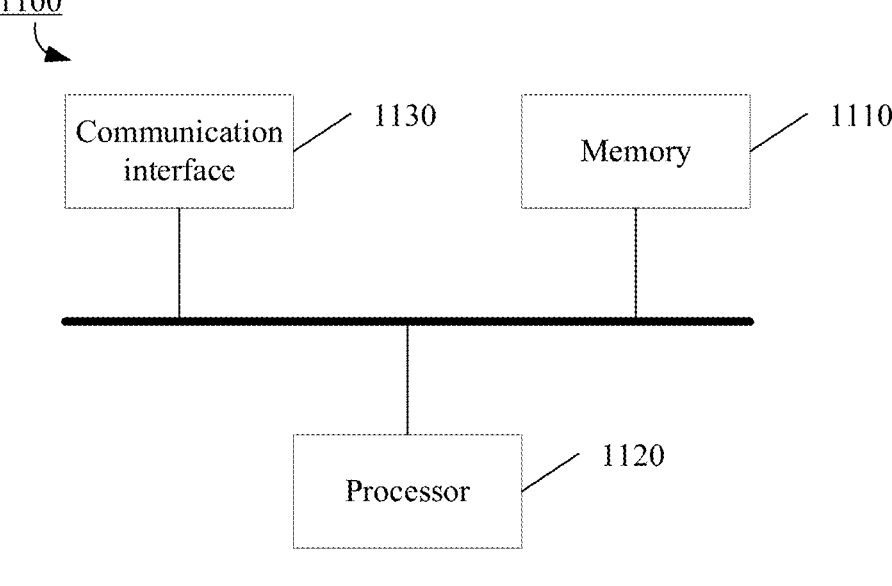
FIG. 11 is a block diagram of an electronic device, according to some embodiments of the present disclosure.

FIG. 11 is a block diagram of an electronic device 1100 according to some embodiments of the present disclosure. As shown in FIG. 11, the electronic device 1100 includes: a memory 1110 and a processor 1120. The memory 1110 has a computer program stored therein that can run on the processor 1120. When the processor 1120 executes the computer program, the method in the above embodiments is implemented. The number of memory 1110 and processor 1120 may be one or more.

The electronic device 1100 further includes: a communication interface 1130 configured to communicate with external devices for data interactive transmission.

If the memory 1110, the processor 1120 and the communication interface 1130 are implemented independently, the memory 1110, the processor 1120 and the communication interface 1130 can be connected to each other through a bus and communicate with each other. The bus may be an Industry Standard Architecture (ISA) bus, a Peripheral Component Interconnect (PCI) bus, an Extended Industry Standard Architecture (EISA) bus, or the like. The bus may be classified into an address bus, a data bus, a control bus and the like. For ease of illustration, it is represented by only one thick line in FIG. 11, but this does not mean that there is only one bus or one type of bus.

Optionally, in terms of specific implementation, if the memory 1110, the processor 1120 and the communication interface 1130 are integrated on one chip, the memory 1110, the processor 1120 and the communication interface 1130 can communicate with each other through the internal interface.

The embodiments of the present application further provide a computer-readable storage medium having a computer program stored thereon, which, when executed by the processor, implements the method provided by the embodiments of the present application.

The embodiments of the present application further provide a chip including a processor to call and run instructions stored in the memory, so that the communication device equipped with the chip executes the method provided by the embodiments of the present application.

Embodiments of the present application further provide a chip, including: an input interface, an output interface, a processor, and a memory. The input interface, the output interface, the processor, and the memory are connected through an internal connection path. The processor is configured to execute the code in the memory. When the code is executed, the processor is configured to execute the method provided by the embodiments of the present application.

The embodiments may further be described using the following clauses:

1. A motion compensation method, comprising:

acquiring a motion vector of an initial search point in a reference frame of an adjacent block to a to-be-processed block in a to-be-processed image and a motion vector of the adjacent block;

determining a search range in the reference frame based on the motion vector of the initial search point and the motion vector of the adjacent block;

determining a target pixel in the search range; and performing motion compensation on the to-be-processed block based on the motion vector of the target pixel.

2. The method according to clause 1, wherein determining a search range in the reference frame based on the motion vector of the initial search point and the motion vector of the adjacent block comprises:

determining a search side length of the search range based on a distance between the motion vector of the initial search point of the adjacent block and the motion vector of the adjacent block; and determining the search range in the reference frame based on the search side length.

3. The method according to clause 2, wherein there is one adjacent block, and determining the search side length of the search range based on the distance between the motion vector of the initial search point of the adjacent block and the motion vector of the adjacent block comprises:

determining a search parameter value of the adjacent block by using the distance between the motion vector of the initial search point of the adjacent block and a motion vector of the adjacent block; and determining the search side length of the search range based on the search parameter value of the adjacent block.

4. The method according to clause 2, wherein there are a plurality of adjacent blocks, and determining the search side length of the search range based on the distance between the motion vector of the initial search point of the adjacent block and the motion vector of the adjacent block comprises:

acquiring a plurality of distances, each of the plurality of distances corresponding to a distance between a motion vector of an initial search point of one of the plurality of adjacent blocks and a motion vector of the one of the plurality of adjacent blocks;

obtaining a search parameter value by calculating a weighted sum of the plurality of distances; and determining the search side length of the search range based on the search parameter value.

5. The method according to clause 1, wherein determining the target pixel in the search range comprises:

searching for an optimal integer pixel with a diamond search method, in the search range, by starting from the initial search point of the to-be-processed block;

searching for an optimal sub-pixel with the diamond search method by using the optimal integer pixel as a center of the diamond; and determining the target pixel between the optimal integer pixel and the optimal sub-pixel.

6. The method according to clause 5, wherein searching for the optimal integer pixel with the diamond search method, in the search range, by starting from the initial search point of the to-be-processed block comprises:

determining a plurality of matching costs of respective pixel blocks corresponding to the center of the diamond and adjacent integer pixels above, below, left, and right of the center of the diamond with respect to the to-be-processed block by using the initial search point of the to-be-processed block as the center of the diamond;

determining an integer pixel corresponding to the pixel block with a smallest matching cost with respect to the to-be-processed block to be the optimal integer pixel of a current round of diamond search;

taking the optimal integer pixel of the current round of diamond search as the center of the diamond of a next round of diamond search; and searching for an optimal integer pixel of a next round.

7. The method according to clause 5, wherein searching for an optimal integer pixel with a diamond search method, in the search range, by starting from the initial search point of the to-be-processed block comprises:

determining a removal point in a next round of diamond search based on a plurality of matching costs of respective pixel blocks corresponding to a plurality of integer pixels of a current round of diamond search with respect to the to-be-processed block, in the search range, starting from the initial search point of the to-be-processed block; and in a next round of diamond search, searching for the optimal integer pixel among the plurality of integer pixels other than the removal point.

8. The method according to clause 7, wherein in determining the removal point in the next round of diamond search based on the plurality of matching costs of respective pixel blocks corresponding to the plurality of integer pixels of a current round of diamond search with respect to the to-be-processed block, in the search range, starting from the initial search point of the to-be-processed block comprises:

determining the optimal integer pixel of the current round of diamond search based on the plurality of matching costs of the respective pixel blocks corresponding to the plurality of integer pixels of the current round of diamond search with respect to the to-be-processed block, in the search range, starting from the initial search point of the to-be-processed block; and if the optimal integer pixel of the current round of diamond search is an adjacent integer pixel left or right of the center of the diamond, determining the removal point of the next round of diamond search to be an adjacent integer pixel above or below the center of the diamond with a greater matching cost; and if the optimal integer pixel of the current round of diamond search is an adjacent integer pixel above or below the center of the diamond, determining the removal point of the next round of diamond search to be an adjacent integer pixel left or right of the center of the diamond with a greater matching cost.

9. The method according to any one of clauses 5 to 8, further comprising:

if a center of the diamond of a current round of diamond search is the optimal integer pixel, taking the optimal integer pixel as an optimal integer pixel of the to-be-processed block.

10. The method according to any one of clauses 5 to 8, further comprising:

if a degree of approximation between a maximum matching cost and a minimum matching cost of a current round of diamond search meets a preset condition, and a number of search stoppings exceeds a preset threshold, taking the optimal integer pixel as an optimal integer pixel of the to-be-processed block.

11. An electronic device, comprising a memory, a processor, and a computer program stored on the memory, the processor implementing the method of any one of clauses 1 to 10 when executing the computer program.

12. A computer-readable storage medium having a computer program stored thereon, the computer program, when executed by the processor, implementing the method of any one of clauses 1 to 10.

In some embodiments, a non-transitory computer-readable storage medium including instructions is also provided, and the instructions may be executed by a device (such as the disclosed encoder and decoder), for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It is appreciated that the above-described embodiments can be implemented by hardware, or software (program codes), or a combination of hardware and software. If implemented by software, it may be stored in the above-described computer-readable media. The software, when executed by the processor can perform the disclosed methods. The computing units and other functional units described in this disclosure can be implemented by hardware, or software, or a combination of hardware and software. One of ordinary skill in the art will also understand that multiple ones of the above-described modules/units may be combined as one module/unit, and each of the above-described modules/units may be further divided into a plurality of sub-modules/sub-units.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

What is claimed is:

1. A method for encoding a video sequence, the method comprising:
   receiving a video sequence; and
   encoding the video sequence by:
   acquiring a motion vector of an initial search point in a reference frame of an adjacent block to a to-be-processed block in a to-be-processed image and a motion vector of the adjacent block;
   determining a search range in the reference frame based on the motion vector of the initial search point and the motion vector of the adjacent block;
   determining a target pixel in the search range; and
   performing motion compensation on the to-be-processed block based on the motion vector of the target pixel.

2. The method according to claim 1, wherein determining a search range in the reference frame based on the motion vector of the initial search point and the motion vector of the adjacent block comprises:
   determining a search side length of the search range based on a distance between the motion vector of the initial search point of the adjacent block and the motion vector of the adjacent block; and
   determining the search range in the reference frame based on the search side length.

3. The method according to claim 2, wherein there is one adjacent block, and determining the search side length of the search range based on the distance between the motion vector of the initial search point of the adjacent block and the motion vector of the adjacent block comprises:
   determining a search parameter value of the adjacent block by using the distance between the motion vector of the initial search point of the adjacent block and a motion vector of the adjacent block; and
   determining the search side length of the search range based on the search parameter value of the adjacent block.

4. The method according to claim 2, wherein there are a plurality of adjacent blocks, and determining the search side length of the search range based on the distance between the motion vector of the initial search point of the adjacent block and the motion vector of the adjacent block comprises:
   acquiring a plurality of distances, each of the plurality of distances corresponding to a distance between a motion vector of an initial search point of one of the plurality of adjacent blocks and a motion vector of the one of the plurality of adjacent blocks;
   obtaining a search parameter value by calculating a weighted sum of the plurality of distances; and
   determining the search side length of the search range based on the search parameter value.

5. The method according to claim 1, wherein determining the target pixel in the search range comprises:
   searching for an optimal integer pixel with a diamond search method, in the search range, by starting from the initial search point of the to-be-processed block;
   searching for an optimal sub-pixel with the diamond search method by using the optimal integer pixel as a center of the diamond; and
   determining the target pixel between the optimal integer pixel and the optimal sub-pixel.

6. The method according to claim 5, wherein searching for the optimal integer pixel with the diamond search method, in the search range, by starting from the initial search point of the to-be-processed block comprises:
   determining a plurality of matching costs of respective pixel blocks corresponding to the center of the diamond and adjacent integer pixels above, below, left, and right of the center of the diamond with respect to the to-be-processed block by using the initial search point of the to-be-processed block as the center of the diamond;

determining an integer pixel corresponding to the pixel block with a smallest matching cost with respect to the to-be-processed block to be the optimal integer pixel of a current round of diamond search;

taking the optimal integer pixel of the current round of diamond search as the center of the diamond of a next round of diamond search; and searching for an optimal integer pixel of a next round.

7. The method according to claim 5, wherein searching for an optimal integer pixel with a diamond search method, in the search range, by starting from the initial search point of the to-be-processed block comprises:

determining a removal point in a next round of diamond search based on a plurality of matching costs of respective pixel blocks corresponding to a plurality of integer pixels of a current round of diamond search with respect to the to-be-processed block, in the search range, starting from the initial search point of the to-be-processed block; and in the next round of diamond search, searching for the optimal integer pixel among the plurality of integer pixels other than the removal point.

8. The method according to claim 7, wherein in determining the removal point in the next round of diamond search based on the plurality of matching costs of respective pixel blocks corresponding to the plurality of integer pixels of the current round of diamond search with respect to the to-be-processed block, in the search range, starting from the initial search point of the to-be-processed block comprises:

determining the optimal integer pixel of the current round of diamond search based on the plurality of matching costs of the respective pixel blocks corresponding to the plurality of integer pixels of the current round of diamond search with respect to the to-be-processed block, in the search range, starting from the initial search point of the to-be-processed block; and if the optimal integer pixel of the current round of diamond search is an adjacent integer pixel left or right of the center of the diamond, determining the removal point of the next round of diamond search to be an adjacent integer pixel above or below the center of the diamond with a greater matching cost; or if the optimal integer pixel of the current round of diamond search is an adjacent integer pixel above or below the center of the diamond, determining the removal point of the next round of diamond search to be an adjacent integer pixel left or right of the center of the diamond with a greater matching cost.

9. The method according to claim 5, further comprising:

if a center of the diamond of a current round of diamond search is the optimal integer pixel, taking the optimal integer pixel as an optimal integer pixel of the to-be-processed block.

10. The method according to claim 5, further comprising:

if a degree of approximation between a maximum matching cost and a minimum matching cost of a current round of diamond search meets a preset condition, and a number of search stoppings exceeds a preset threshold, taking the optimal integer pixel as an optimal integer pixel of the to-be-processed block.

11. A method for decoding a bitstream, the method comprising:

receiving a bitstream; and decoding the bitstream to generate a video sequence, the decoding comprising:

acquiring a motion vector of an initial search point in a reference frame of an adjacent block to a to-be-processed block in a to-be-processed image and a motion vector of the adjacent block;

determining a search range in the reference frame based on the motion vector of the initial search point and the motion vector of the adjacent block;

determining a target pixel in the search range; and performing motion compensation on the to-be-processed block based on the motion vector of the target pixel.

12. The method according to claim 11, wherein determining a search range in the reference frame based on the motion vector of the initial search point and the motion vector of the adjacent block comprises:

determining a search side length of the search range based on a distance between the motion vector of the initial search point of the adjacent block and the motion vector of the adjacent block; and determining the search range in the reference frame based on the search side length.

13. The method according to claim 12, wherein there is one adjacent block, and determining the search side length of the search range based on the distance between the motion vector of the initial search point of the adjacent block and the motion vector of the adjacent block comprises:

determining a search parameter value of the adjacent block by using the distance between the motion vector of the initial search point of the adjacent block and a motion vector of the adjacent block; and determining the search side length of the search range based on the search parameter value of the adjacent block.

14. The apparatus according to claim 12, wherein there are a plurality of adjacent blocks, and determining the search side length of the search range based on the distance between the motion vector of the initial search point of the adjacent block and the motion vector of the adjacent block comprises:

acquiring a plurality of distances, each of the plurality of distances corresponding to a distance between a motion vector of an initial search point of one of the plurality of adjacent blocks and a motion vector of the one of the plurality of adjacent blocks;

obtaining a search parameter value by calculating a weighted sum of the plurality of distances; and determining the search side length of the search range based on the search parameter value.

15. The method according to claim 11, wherein determining the target pixel in the search range comprises:

searching for an optimal integer pixel with a diamond search method, in the search range, by starting from the initial search point of the to-be-processed block;

searching for an optimal sub-pixel with the diamond search method by using the optimal integer pixel as a center of the diamond; and determining the target pixel between the optimal integer pixel and the optimal sub-pixel.

16. A method for signaling a bitstream, the method comprising:

receiving a video sequence;

encoding the video sequence by:

acquiring a motion vector of an initial search point in a reference frame of an adjacent block to a to-be-processed block in a to-be-processed image and a motion vector of the adjacent block;

determining a search range in the reference frame based on the motion vector of the initial search point and the motion vector of the adjacent block;

determining a target pixel in the search range; and performing motion compensation on the to-be-processed block based on the motion vector of the target pixel; and signaling a bitstream that is generated based on the encoding.

17. The method according to claim 16, wherein determining a search range in the reference frame based on the motion vector of the initial search point and the motion vector of the adjacent block comprises:

determining a search side length of the search range based on a distance between the motion vector of the initial search point of the adjacent block and the motion vector of the adjacent block; and determining the search range in the reference frame based on the search side length.

18. The method according to claim 17, wherein there is one adjacent block, and determining the search side length of the search range based on the distance between the motion vector of the initial search point of the adjacent block and the motion vector of the adjacent block comprises:

determining a search parameter value of the adjacent block by using the distance between the motion vector of the initial search point of the adjacent block and a motion vector of the adjacent block; and determining the search side length of the search range based on the search parameter value of the adjacent block.

19. The method according to claim 17, wherein there are a plurality of adjacent blocks, and determining the search side length of the search range based on the distance between the motion vector of the initial search point of the adjacent block and the motion vector of the adjacent block comprises:

acquiring a plurality of distances, each of the plurality of distances corresponding to a distance between a motion vector of an initial search point of one of the plurality of adjacent blocks and a motion vector of the one of the plurality of adjacent blocks;

obtaining a search parameter value by calculating a weighted sum of the plurality of distances; and determining the search side length of the search range based on the search parameter value.

20. The method according to claim 16, wherein determining the target pixel in the search range comprises:

searching for an optimal integer pixel with a diamond search method, in the search range, by starting from the initial search point of the to-be-processed block;

searching for an optimal sub-pixel with the diamond search method by using the optimal integer pixel as a center of the diamond; and determining the target pixel between the optimal integer pixel and the optimal sub-pixel.

* * * * *